(12) United States Patent
Loo et al.

(10) Patent No.: US 10,031,345 B2
(45) Date of Patent: Jul. 24, 2018

(54) SLIP-RESISTANT EYEWEAR SYSTEM

(71) Applicant: LooLoops, LLC, Scottsdale, AZ (US)

(72) Inventors: Kent Chill Loo, Scottsdale, AZ (US);
Joseph Pepe Elijio Velasquez, Tempe, AZ (US); Robert James Fulbright, Tempe, AZ (US); Yu Liu, Tempe, AZ (US)

(73) Assignee: LooLoops, LLC, Scottsdale, AZ (US)

( * ) Notice: Subject to any disclaimer, the term of this patent is extended or adjusted under 35 U.S.C. 154(b) by 5 days.

(21) Appl. No.: 15/263,266

(22) Filed: Sep. 12, 2016

(65) Prior Publication Data

US 2017/0168316 A1 Jun. 15, 2017

Related U.S. Application Data

(60) Provisional application No. 62/267,558, filed on Dec. 15, 2015.

(51) Int. Cl.
| | |
|---|---|
| *G02C 11/08* | (2006.01) |
| *G02C 3/00* | (2006.01) |
| *G02C 5/12* | (2006.01) |
| *G02C 5/22* | (2006.01) |
| *G02C 11/04* | (2006.01) |
| *G02C 7/08* | (2006.01) |

(52) U.S. Cl.
CPC ............. *G02C 3/003* (2013.01); *G02C 3/006* (2013.01); *G02C 5/122* (2013.01); *G02C 5/22* (2013.01); *G02C 5/2263* (2013.01); *G02C 7/088* (2013.01); *G02C 11/04* (2013.01); *G02C 11/08* (2013.01)

(58) Field of Classification Search
CPC ...... G02C 3/003; G02C 3/006; G02C 5/2263; G02C 5/22; G02C 5/122; G02C 7/088; G02C 11/04; G02C 11/08
USPC .............................................. 351/41, 63, 62
See application file for complete search history.

(56) References Cited

U.S. PATENT DOCUMENTS

| | | | |
|---|---|---|---|
| 4,045,137 | A | 8/1977 | Bradley, Jr. |
| 4,190,334 | A | 2/1980 | O'Neill |
| 4,204,750 | A | 5/1980 | Hilbert |
| 4,280,758 | A | 7/1981 | Flader |

(Continued)

FOREIGN PATENT DOCUMENTS

| | | |
|---|---|---|
| WO | WO2008103386 | 8/2008 |
| WO | WO2011008264 | 1/2011 |

(Continued)

*Primary Examiner* — Tuyen Tra
(74) *Attorney, Agent, or Firm* — Michelle L. Gross, P.C.

(57) ABSTRACT

A slip-resistant eyewear system comprising an eyewear frame generally comprises a nosepiece comprising a nosepiece material configured to couple to a bridge of an eyewear frame. The frame comprises first and second hinges coupled to the eyewear frame which are also coupled to first and second spring-loaded tension adjusters. First and second bows are coupled to first and second tension adjusters. A first bow extension element is coupled to the first bow and comprises a first fastening element at a first end of the first bow extension element and a second bow extension element is coupled to the second bow and comprises a second fastening element at a first end of the second bow extension element that is configured to mate with the first fastening element to secure the first and second bow extension elements together.

19 Claims, 37 Drawing Sheets

(56) References Cited

U.S. PATENT DOCUMENTS

| | | | |
|---|---|---|---|
| 4,810,080 A * | 3/1989 | Grendol | A61F 9/02 |
| | | | 351/138 |
| 5,157,425 A | 10/1992 | Liu | |
| 5,200,771 A | 4/1993 | Schmolz | |
| 5,737,055 A * | 4/1998 | Dittmeier | G02C 5/126 |
| | | | 351/136 |
| 7,635,184 B2 | 12/2009 | Frahm | |
| 9,081,206 B2 * | 7/2015 | Batey | G02C 5/001 |
| 2009/0021691 A1 | 1/2009 | Yang | |
| 2011/0025974 A1 * | 2/2011 | Schepke | G02C 1/04 |
| | | | 351/105 |
| 2012/0236252 A1 | 9/2012 | Wang | |
| 2014/0090655 A1 | 4/2014 | Robinson | |
| 2015/0365757 A1 | 12/2015 | Abreu | |

FOREIGN PATENT DOCUMENTS

| WO | WO2012038835 | 3/2014 |
|---|---|---|
| WO | WO2014201500 | 12/2014 |
| WO | WO2016139511 | 9/2016 |

* cited by examiner

SECTION A-A

SECTION B-B

SECTION C-C

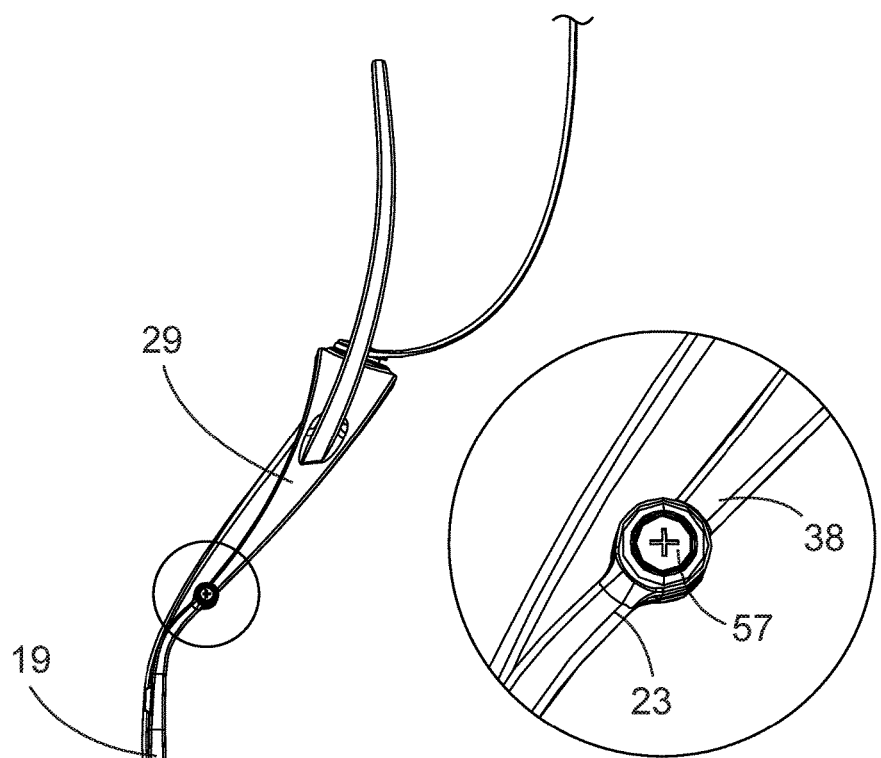
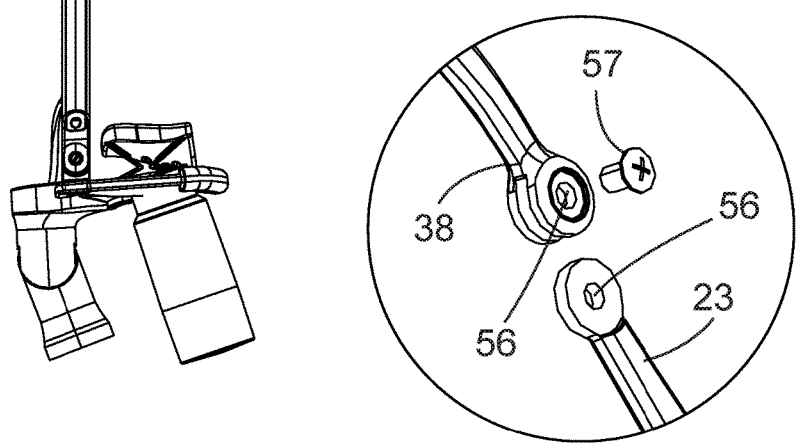
FIG. 41  FIG. 42  FIG. 43

SLIP-RESISTANT EYEWEAR SYSTEM

CROSS REFERENCE TO RELATED APPLICATIONS

This application claims priority under Title 35, United States Code, Section 119(e) to U.S. provisional patent application Ser. No. 62/267,558 filed Dec. 15, 2015, the content of which is hereby incorporated by reference in its entirety.

STATEMENT REGARDING FEDERALLY SPONSORED RESEARCH OR DEVELOPMENT

Not applicable to this application.

BACKGROUND

1. Field of the Invention

Example embodiments in general relate to an eyewear system that resists slipage or an unintended change in position when worn by a user.

2. Related Art

Physicians, dentists, veterinarians, jewelers, and many other professionals utilize eyewear such as loupes for magnifying an area on which they are working. It is commonly known among these professionals that loupes are quite heavy even at low magnification powers and can increase in weight substantially as the magnification power desired by the user increases. When loupes are attached to a traditional eyewear frame, the weight of the loupes often causes the eyewear to slide or otherwise change position as the user works and moves, which causes the user to manually readjust the position of the eyewear on the user's face. This problem is compounded for users who have a flat or less pronounced nasal bridge which is a common facial characteristic among certain ancestral heritages.

Conventional solutions to this problem include attaching a cord or other string-like device to the bows of the eyewear frame and securing the cord behind the head of the user to minimize sliding or other movement of the eyewear when in use. This solution, however, leads to hygienic issues as a soft material such as a cord cannot be sanitized to comply with medical and dental sanitization standards and may be touched by the user throughout the course of patient treatment leading to cross-contamination across patients. Tightening a cord behind the user's head can also be quite uncomfortable as the cord must be tightened sufficiently that a great deal of pressure may be applied to the user's face. While such prior solutions are suitable for lightweight eyewear such as, for example, sunglasses, they are not suitable for comfortably securing heavier eyewear such as loupes.

SUMMARY

An example embodiment of the present invention is directed to a slip-resistant eyewear system. The slip-resistant eyewear system includes various features that individually or in combination prevent eyewear from slipping or changing position when worn by a user.

There has thus been outlined, rather broadly, some of the features of the slip-resistant eyewear system in order that the detailed description thereof may be better understood, and in order that the present contribution to the art may be better appreciated. There are additional features of the slip-resistant eyewear system that will be described hereinafter and that will form the subject matter of the claims appended hereto. In this respect, before explaining at least one embodiment of the slip-resistant eyewear system in detail, it is to be understood that the slip-resistant eyewear system is not limited in its application to the details of construction or to the arrangements of the components set forth in the following description or illustrated in the drawings. The slip-resistant eyewear system is capable of other embodiments and of being practiced and carried out in various ways. Also, it is to be understood that the phraseology and terminology employed herein are for the purpose of the description and should not be regarded as limiting.

Embodiments of a slip-resistant eyewear system may comprise a nosepiece comprising a nosepiece material configured to couple to a bridge of an eyewear frame. The slip-resistant eyewear system may comprise a tension adjuster configured to couple to a first hinge of the eyewear frame and a first bow. The tension adjuster may comprise a housing configured to house an internally threaded barrel that passes at least partially through a spring. The internally threaded barrel and the spring may be configured to seat at least partially within a first end of a first bow that passes at least partially into the housing. The tension adjuster may further comprise an adjustment screw configured to threadably couple to the internally threaded barrel to adjust a tension of the first bow. The slip-resistant eyewear system may comprise an eyewear retainer having a first bow extension element configured to extend from a second end of the first bow. The first bow extension element may comprise a protrusion extending outwardly from a first end of the first bow extension element and a second bow extension element may be configured to extend from a second end of a second bow. The second bow extension element may comprise an opening at a first end of the second bow extension element that is configured to secure the first and second bow extension elements together by receiving the protrusion of the first bow extension element when the first end of the second bow extension element overlaps the first end of the first bow extension element. Some embodiments may further comprise at least one of an eyewear retainer extension, a light, and an angular adjustment screw that allows an angle of the eyewear frame to be adjusted relative to the tension adjuster.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Brief Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein. Elements and acts in the figures are illustrated for simplicity and have not necessarily been rendered according to any particular sequence or embodiment.

FIG. 41 depicts an exemplary embodiment of a slip-resistant eyewear system comprising a detachable eyewear retainer.

FIGS. 42-43 depict an exemplary structure of an attachment point for the detachable eyewear retainer of FIG. 41.

DETAILED DESCRIPTION

Figure 1:
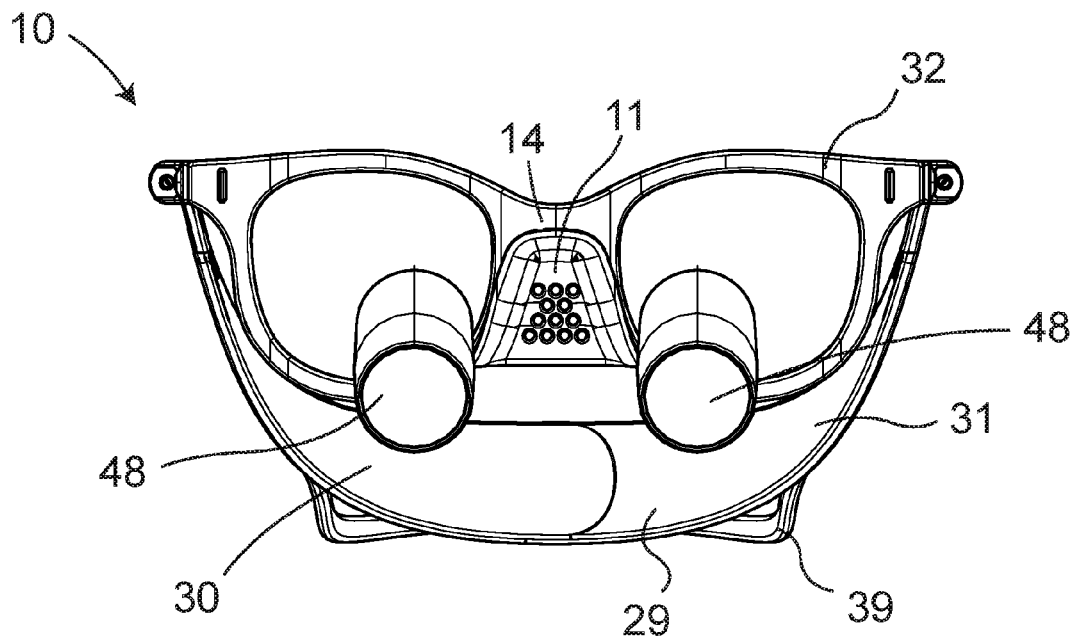
FIG. 1 is a front perspective view of a slip-resistant eyewear system in accordance with an exemplary embodiment.
Figure 2:
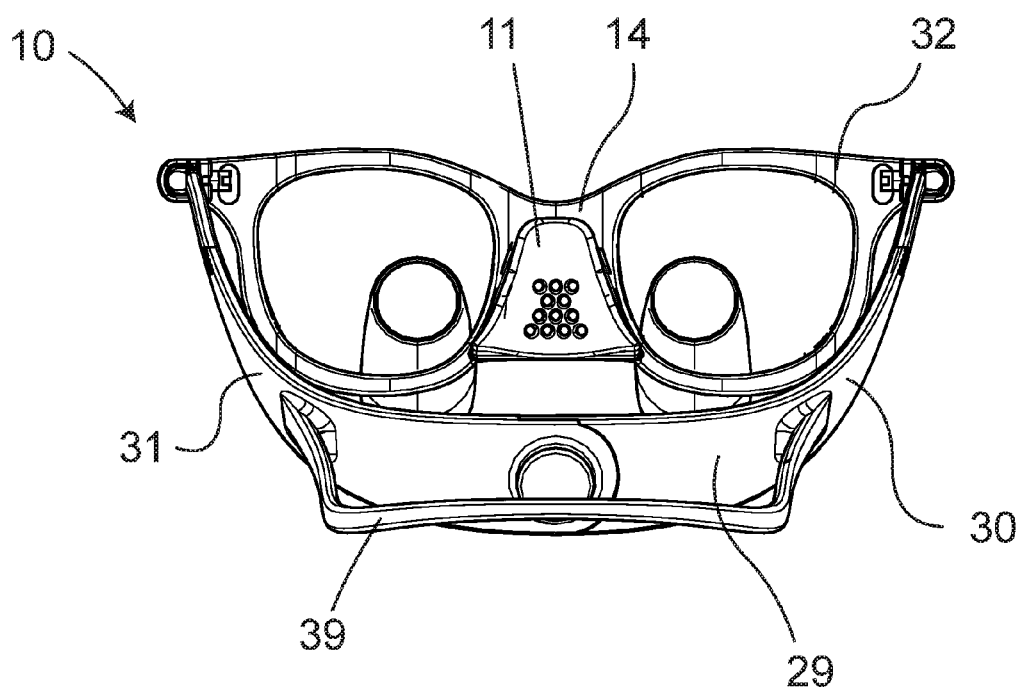
FIG. 2 is a rear perspective view of a slip-resistant eyewear system in accordance with the exemplary embodiment of FIG. 1.
Figure 3:
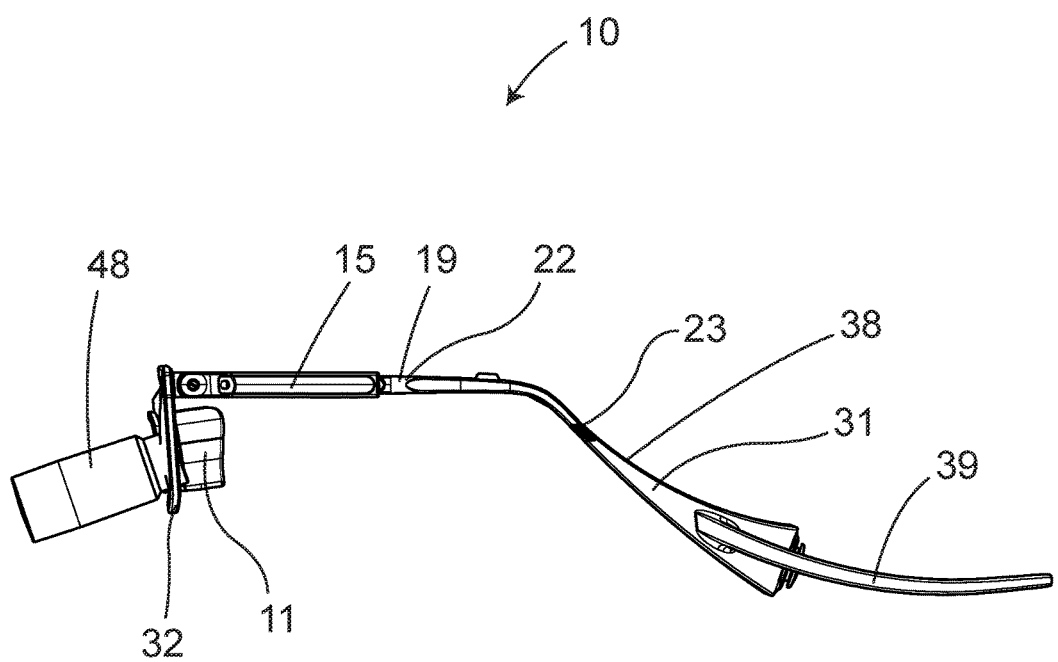
FIG. 3 is a side view of a slip-resistant eyewear system in accordance with the exemplary embodiment of FIGS. 1-2.

Unless otherwise defined, all technical and scientific terms used herein have the same meaning as commonly understood by one of ordinary skill in the art to which this invention belongs. Although methods and materials similar to or equivalent to those described herein can be used in the practice or testing of a slip-resistant eyewear system, suitable methods and materials are described above. All publications, patent applications, patents, and other references mentioned herein are incorporated by reference in their entirety to the extent allowed by applicable law and regulations. The slip-resistant eyewear system may be embodied in other specific forms without departing from the spirit or essential attributes thereof, and it is therefore desired that the present embodiments be considered in all respects as illustrative and not restrictive. Any headings utilized within the description are for convenience only and have no legal or limiting effect.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

The features, structures, or characteristics of the invention described throughout this specification may be combined in any suitable manner in one or more embodiments. For example, the usage of the phrases "exemplary embodiments", "some embodiments" or other similar language refers to the fact that a particular feature, structure, or characteristic described in connection with the embodiment may be included in at least one embodiment of the present invention. Thus, appearances of the phrases "exemplary embodiments", "in some embodiments", "in other embodiments" or other similar language, throughout this specification do not necessarily all refer to the same group of embodiments, and the described features, structures, or characteristics may be combined in any suitable manner in one or more embodiments.

FIGS. 1-7 provide an exemplary embodiment of a slip-resistant eyewear system 10 that is designed to remain in place on the face of a user without changing position during use. While it is contemplated that the system may be used with any type of eyewear, such a system may be particularly useful when loupes 48 are employed such as those used in the medical, dental, veterinary, or jewelry industries. While loupes 48 may be of various weights, they are generally heavy as compared to the weight of the eyewear frame 32 which results in conventional eyewear systems sliding downward when the user looks down or changes the position of the user's head in the normal course of viewing a subject at magnification. To prevent this from occurring, embodiments of a slip-resistant eyewear system 10 as disclosed herein may comprise one or more of the elements described throughout this document to retard slippage and retain the eyewear system in a proper position when in use.

Figure 15:
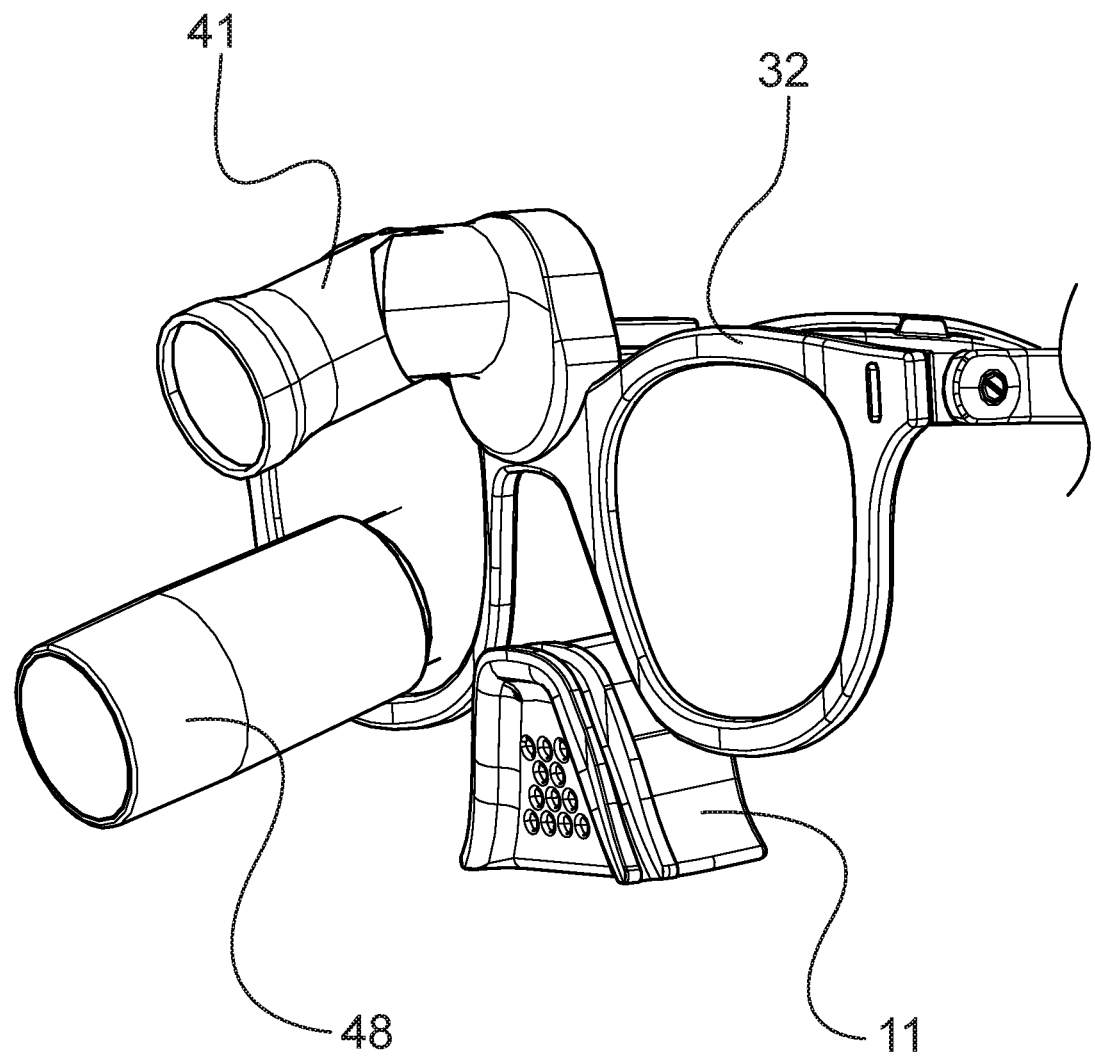
FIG. 15 depicts an exemplary embodiment of a slip-resistant eyewear system comprising a removable nosepiece.
Figure 16:
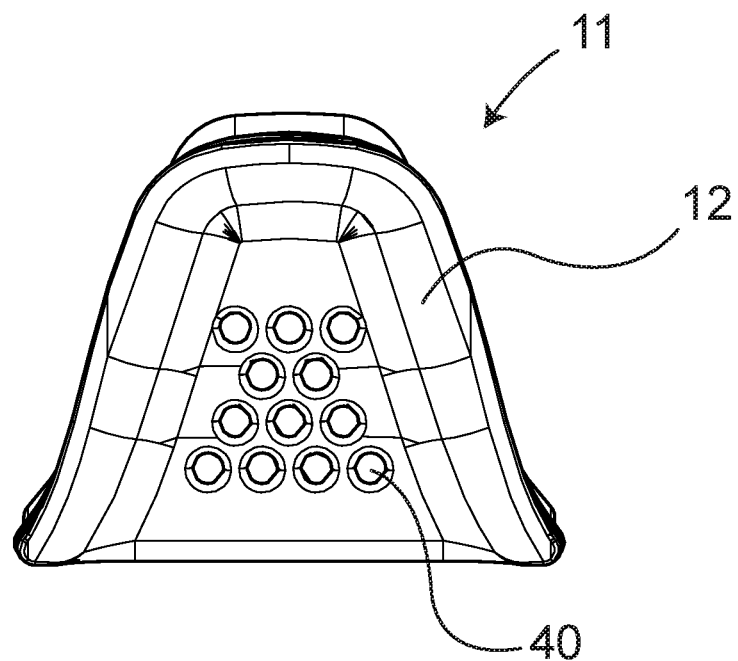
FIGS. 16-23 provide various views of a nosepiece comprising a nosepiece material.
Figure 17:
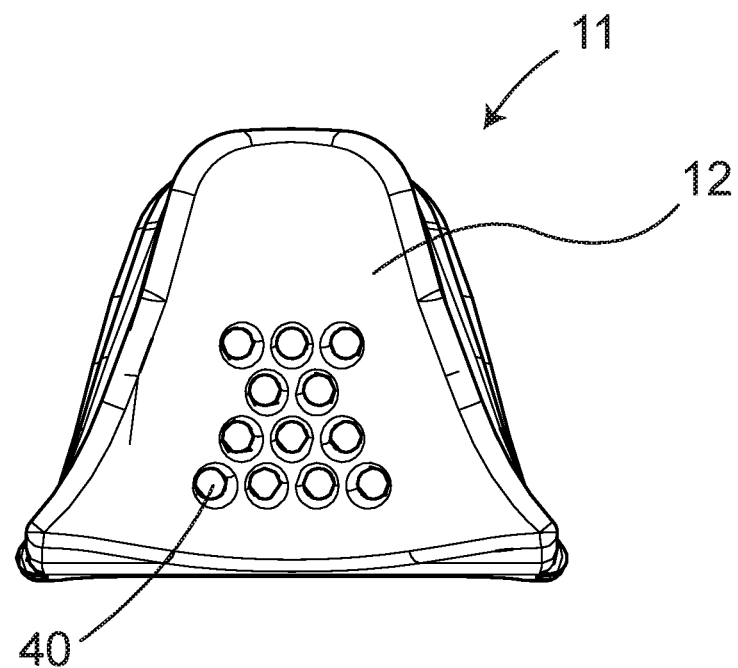
Figure 37:
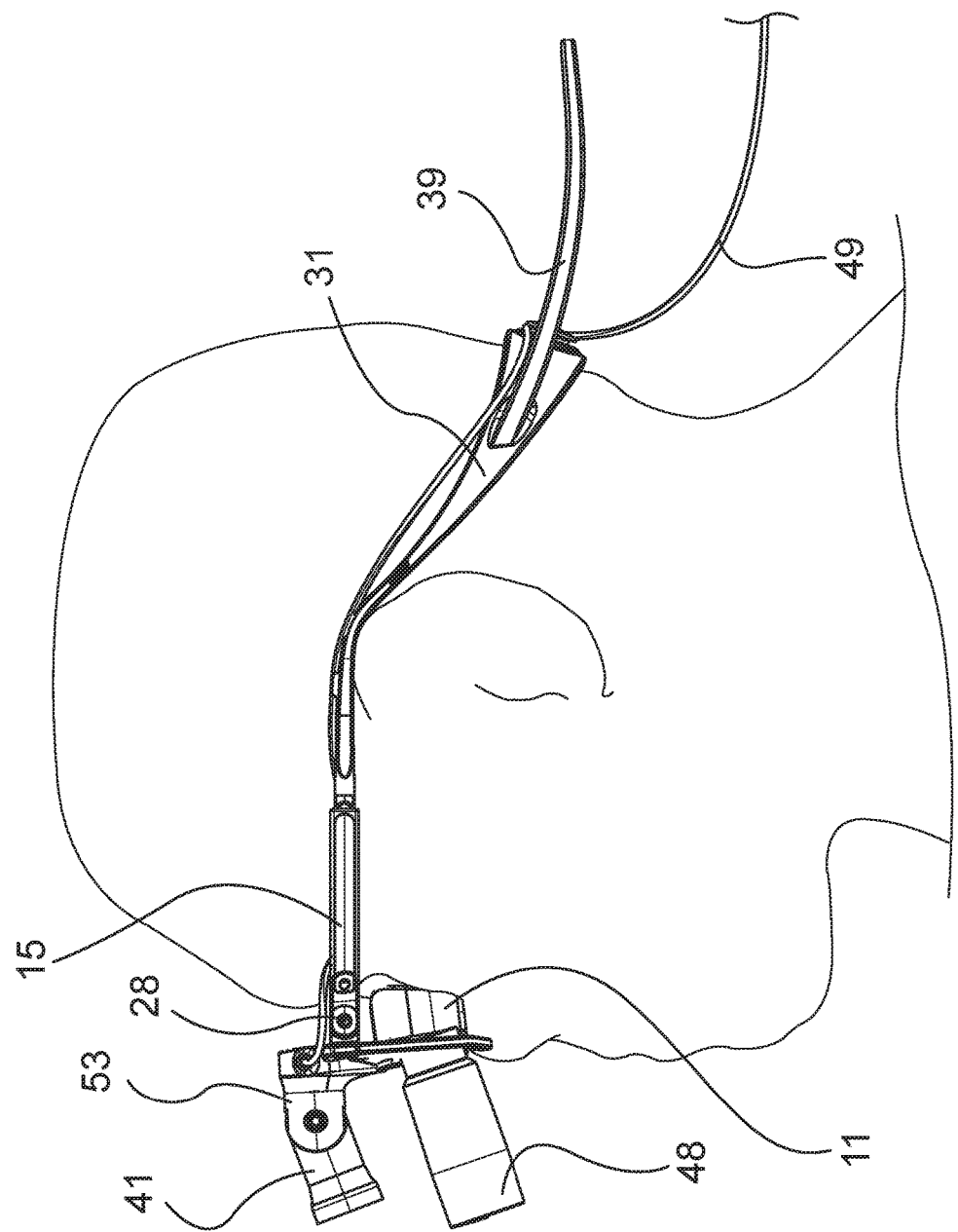
FIGS. 37-39 provide views of a slip-resistant eyewear system in use.
Figure 38:
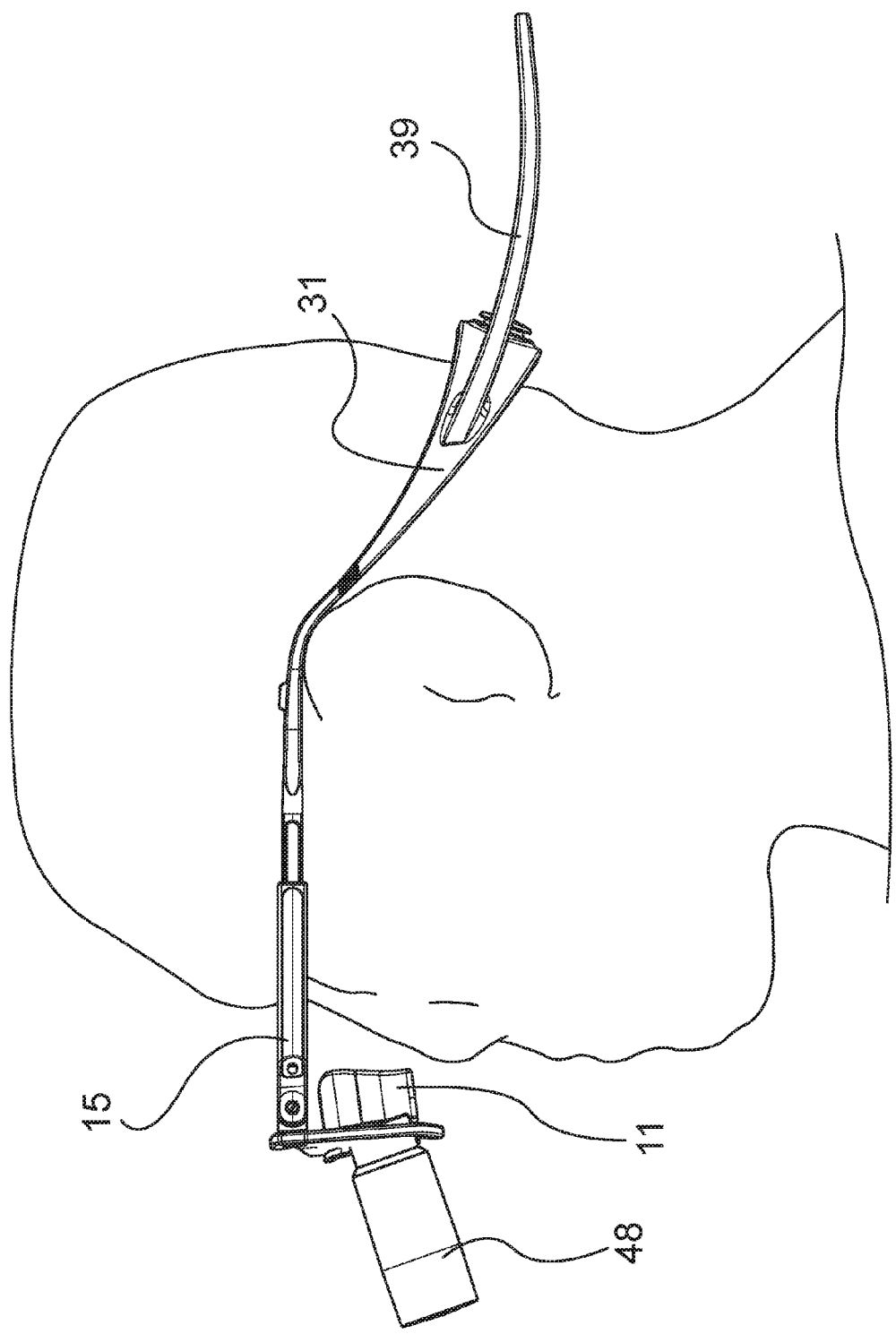
Figure 39:
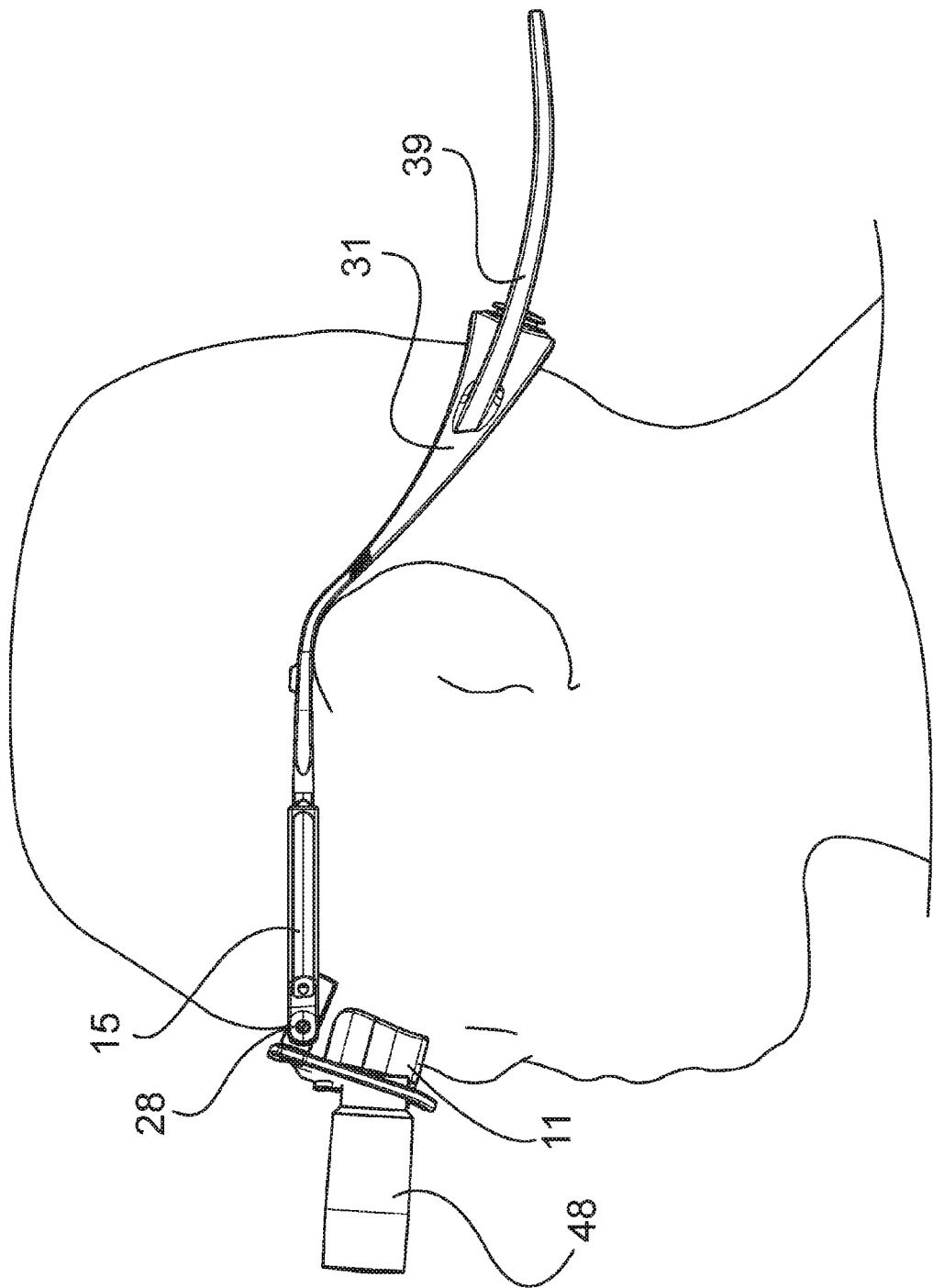

Some embodiments of a slip-resistant eyewear system 10 may comprise a nosepiece 11 that is configured to mate with or otherwise couple to a bridge 14 of an eyewear frame 32. The nosepiece 11 may be detachable as shown in FIG. 15 or alternatively, may be integral to the bridge 14 of the eyewear frame 32. FIGS. 16-21 provide rear, front, side, top and bottom views of an exemplary embodiment of a nosepiece 11. As shown, the nosepiece 11 is comprised of a nosepiece material 12 that may be shaped in accordance with the individual facial features of the user. This may be accomplished by constructing the nosepiece 11 from a moldable material or by three-dimensionally scanning the face of a user and manufacturing the nosepiece 11 to fit the contours of the user's face. This is particularly advantageous when the nosepiece 11 is an element of a slip-resistant eyewear system 10 that is intended to be worn by a user having a flattened or less pronounced nasal bridge, as shown in FIGS. 37-39. By customizing the depth, shape, and countours of the portion of the nosepiece material 12 that will be in contact with the user's face, the nosepiece 11 allows a wearer with a less pronounced nasal bridge to avoid the presence of a gap between the bridge 14 of the eyewear frame 32 and the nasal bridge or other facial surface of the user.

Figure 18:
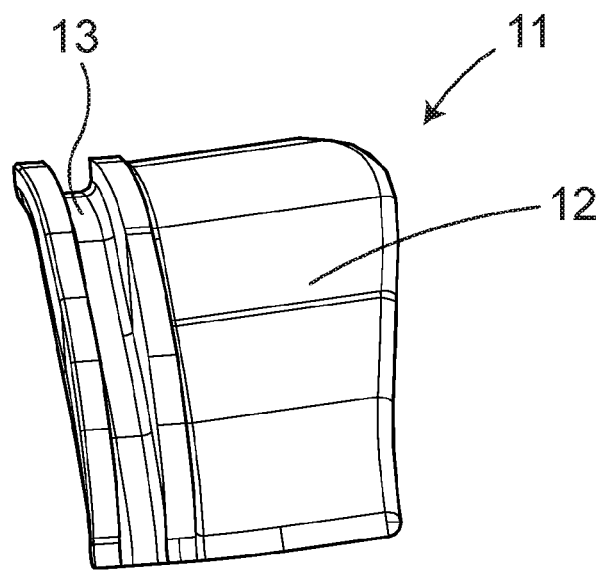
Figure 19:
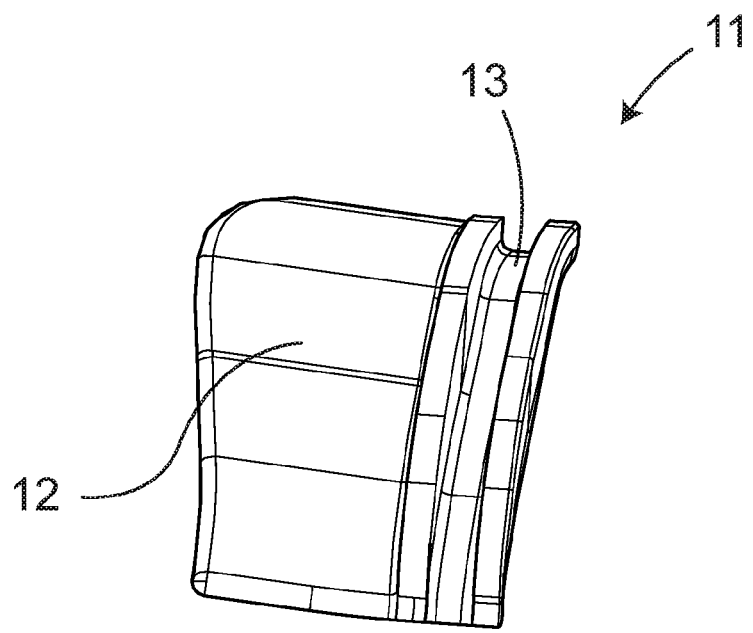
Figure 20:
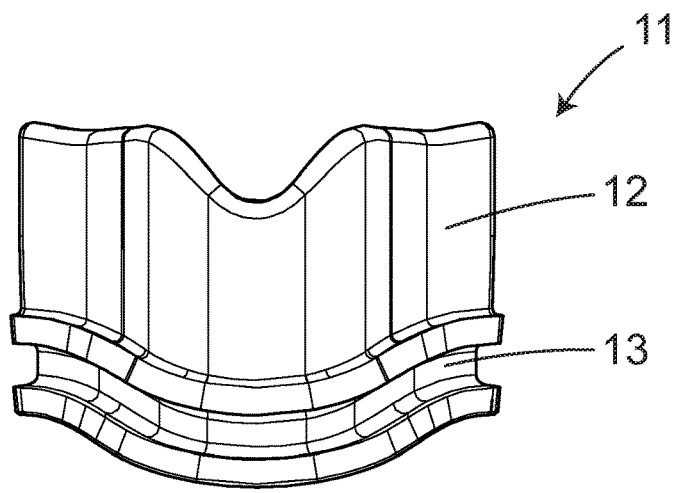
Figure 21:
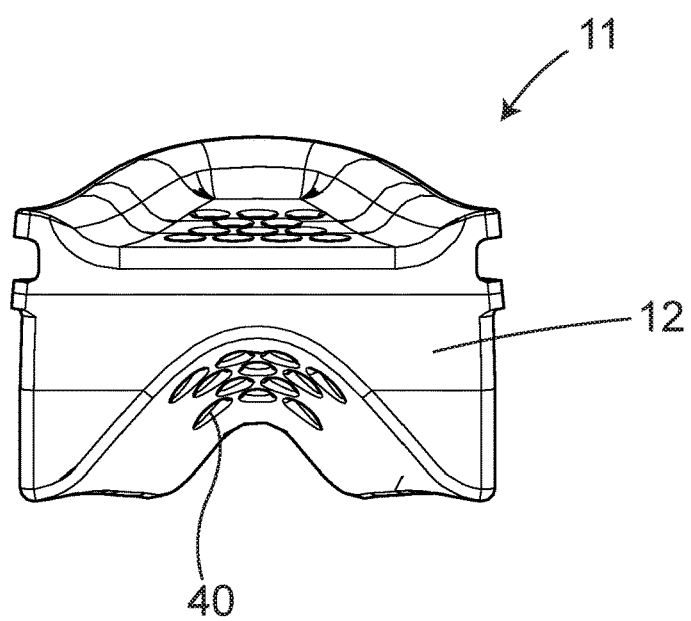
Figure 22:
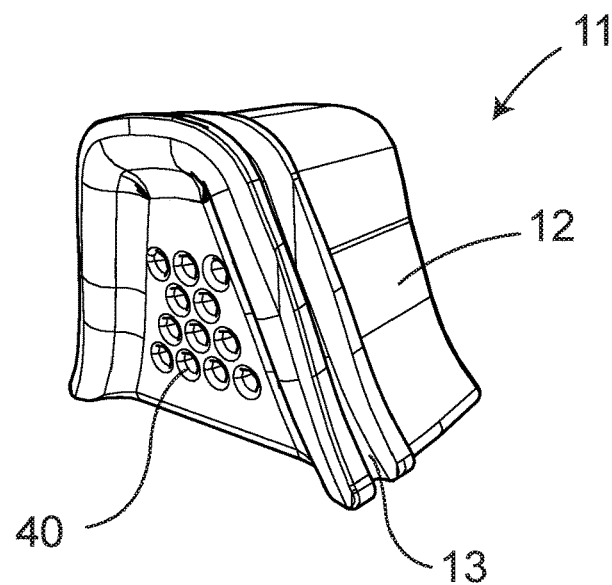
Figure 23:
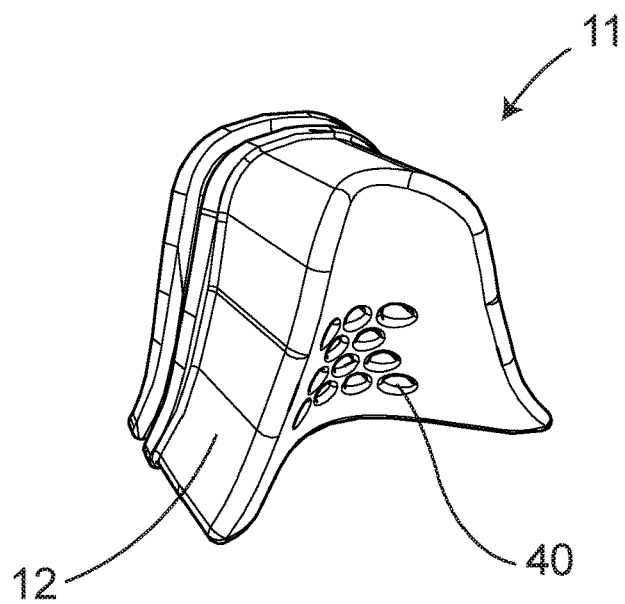
Figure 24:
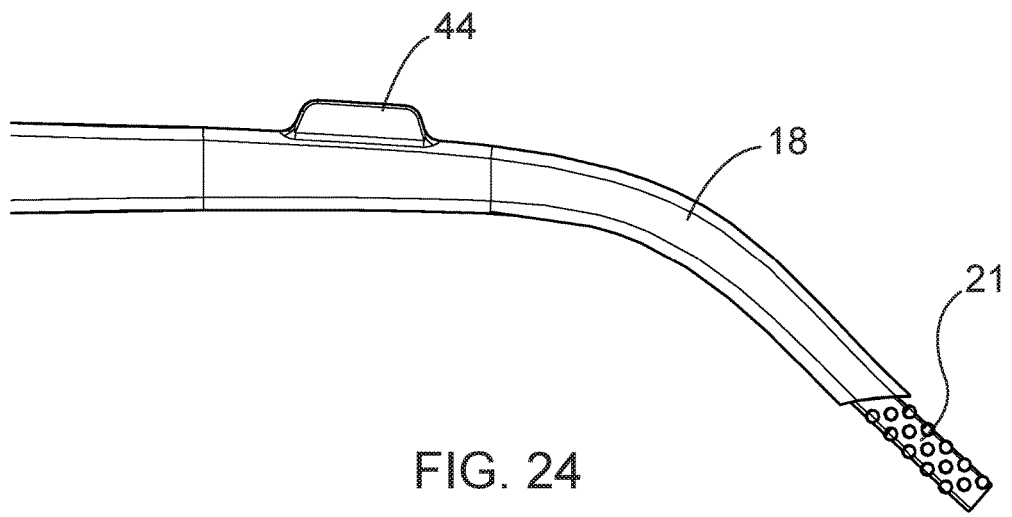
FIG. 24 depicts an exemplary embodiment of a first bow of a slip-resistant eyewear system comprising a clip.
Figure 25:
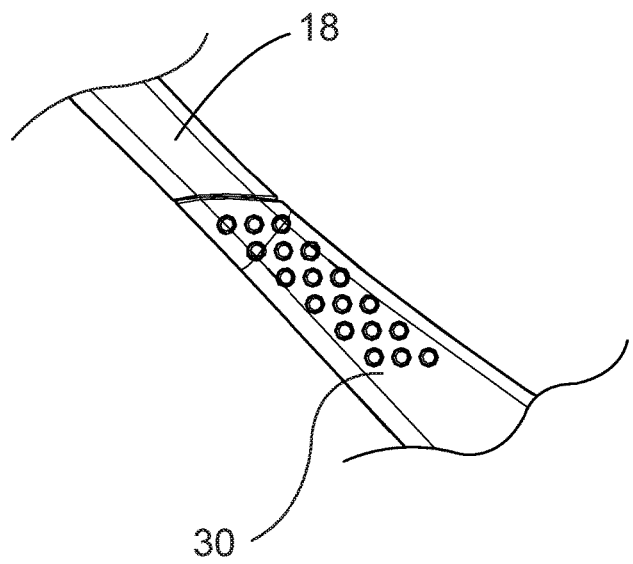
FIGS. 25-27 depict an exemplary embodiment of a first bow and a first bow extension element of a slip-resistant eyewear system.
Figure 26:
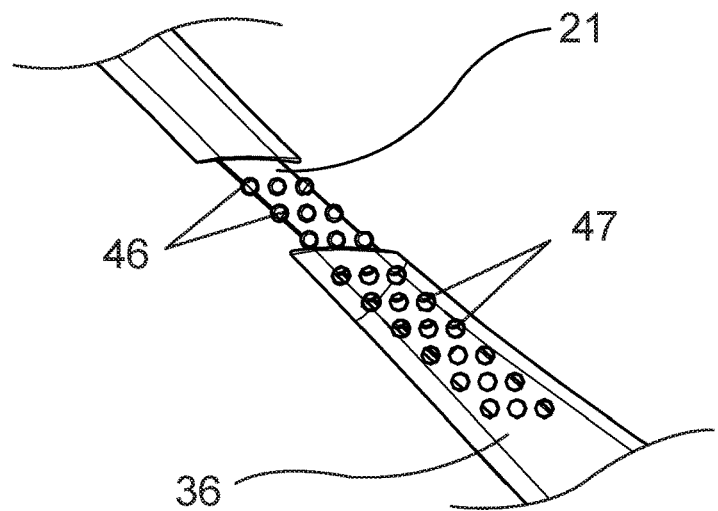
Figure 27:
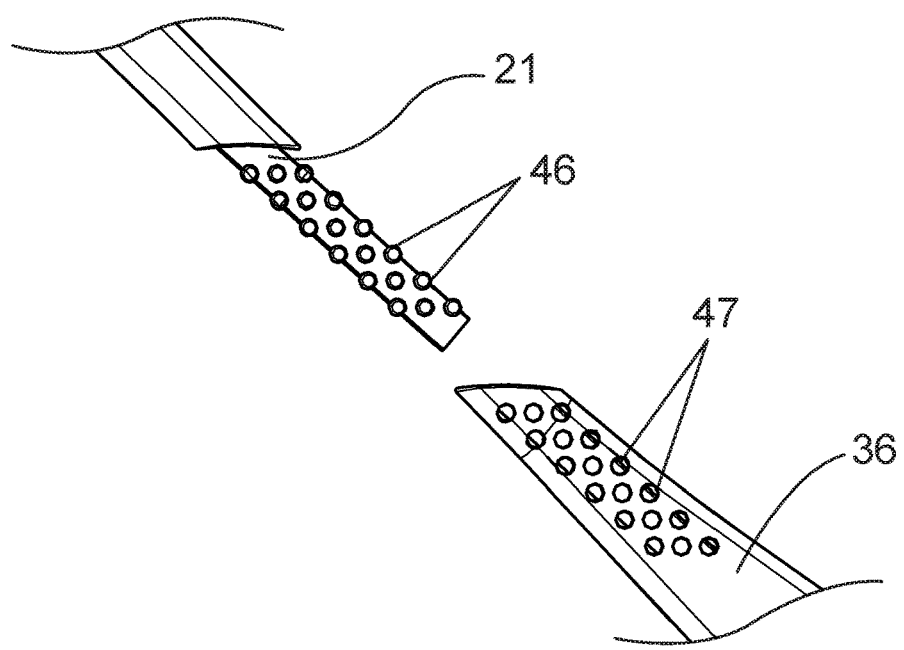

As shown in FIGS. 18-19, the nosepiece 11 may comprise a nosepiece groove 13 running along at least a portion of the top surface of the nosepiece 11. This nosepiece groove 13 is configured to mate with the bridge 14 of the eyewear frame 32 such that the nosepiece 11 is secured to the eyewear frame 32 when the slip-resistant eyewear system 10 is in use. While the nosepiece groove 13 is depicted proximal to the front of the nosepiece 11 as this configuration keeps the nosepiece 11 from protruding excessively past the front of the eyewear frame 32, it is contemplated the the nosepiece groove 13 may be located anywhere on the top surface of the nosepiece 11. In some embodiments, it may be preferable that the nosepiece 11 comprises at least one ventilation opening 40, as shown in FIGS. 22-23, to allow air to pass through the nosepiece 11 to enhance the comfort of the user of the slip-resistant eyewear system 10.

Figure 9:
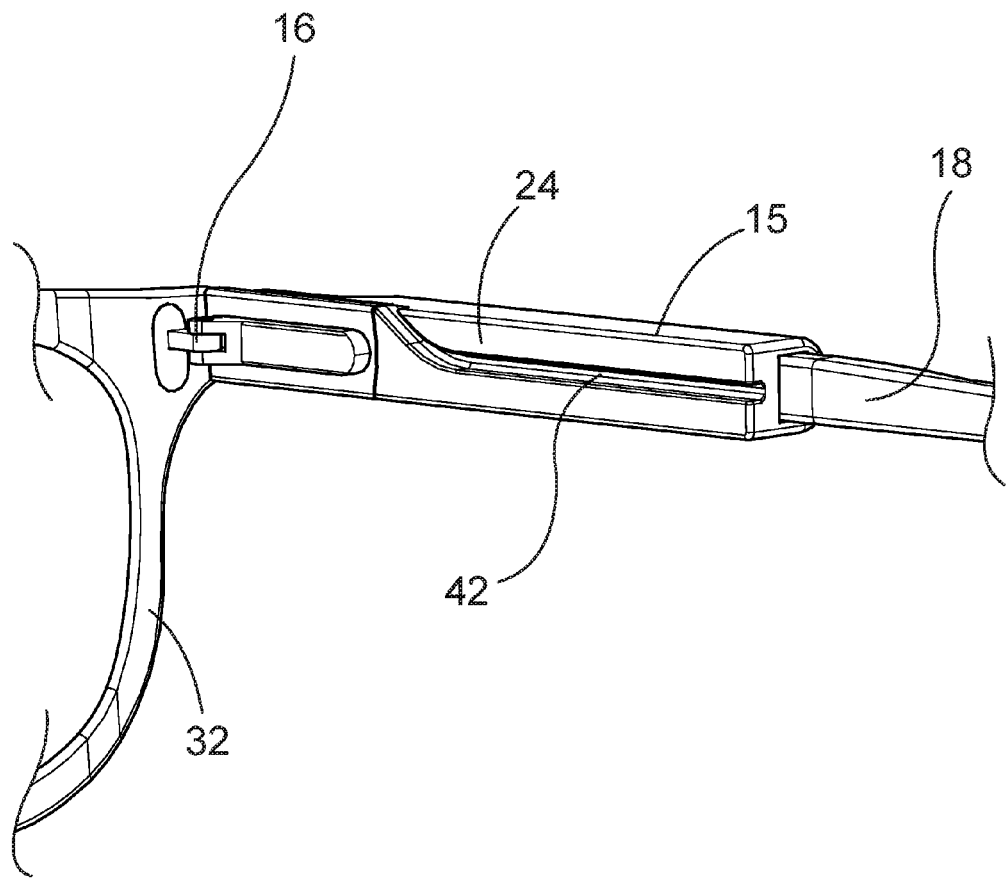
FIG. 9 depicts an exemplary embodiment of a first bow of a slip-resistant eyewear system comprising a channel configured to house a power cord.
Figure 12:
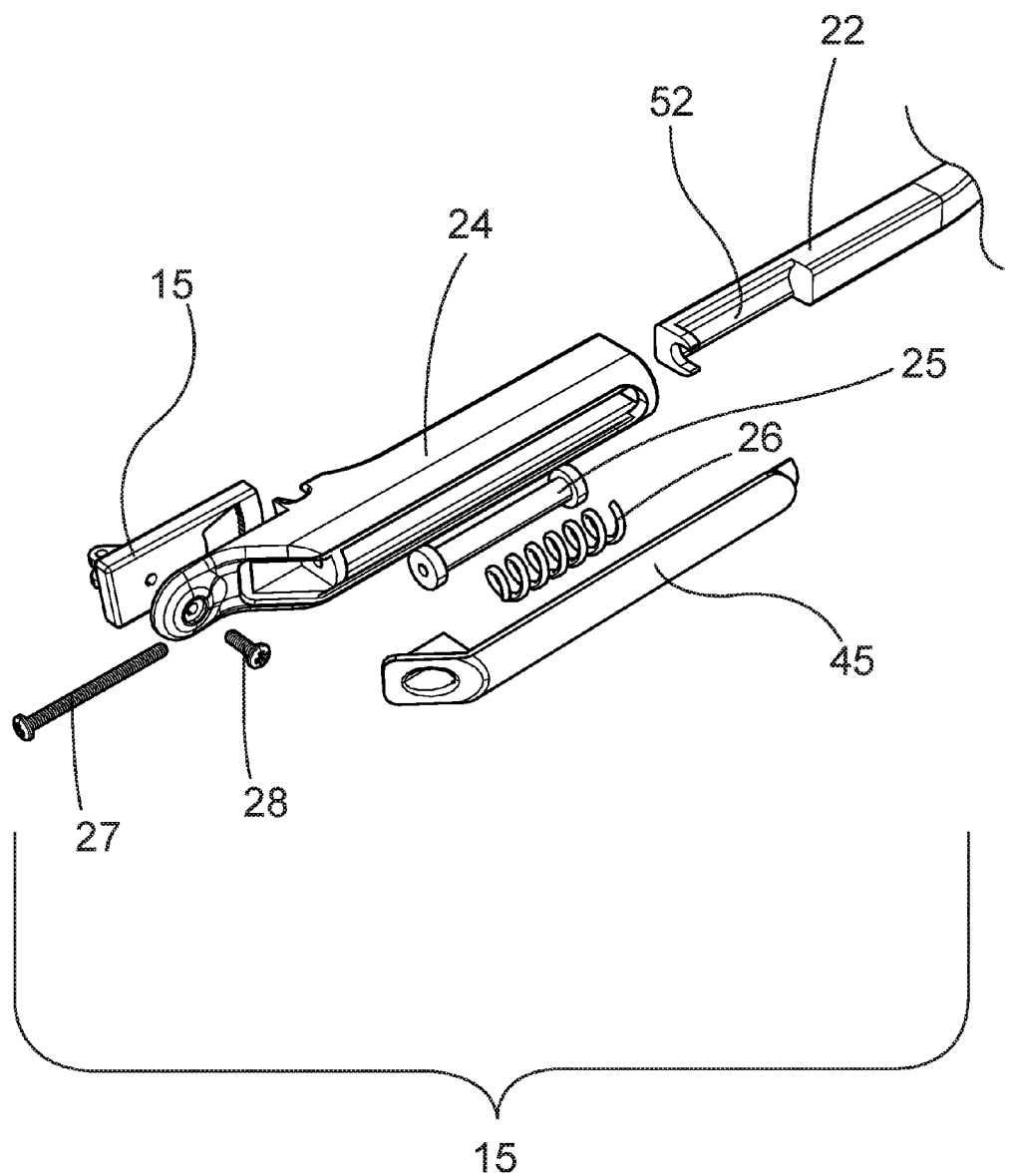
FIGS. 12-14 depict exploded views of an exemplary embodiment of a tension adjuster.
Figure 13:
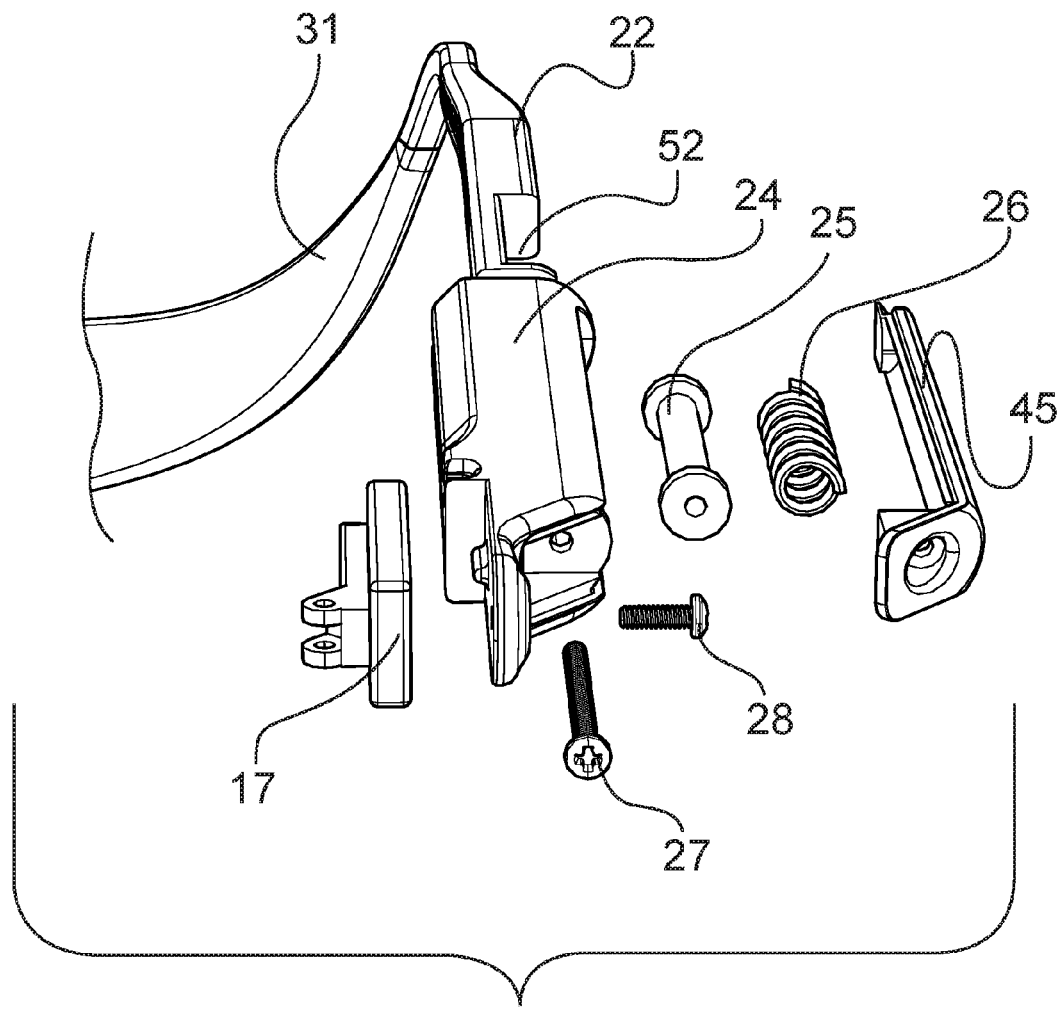
Figure 14:
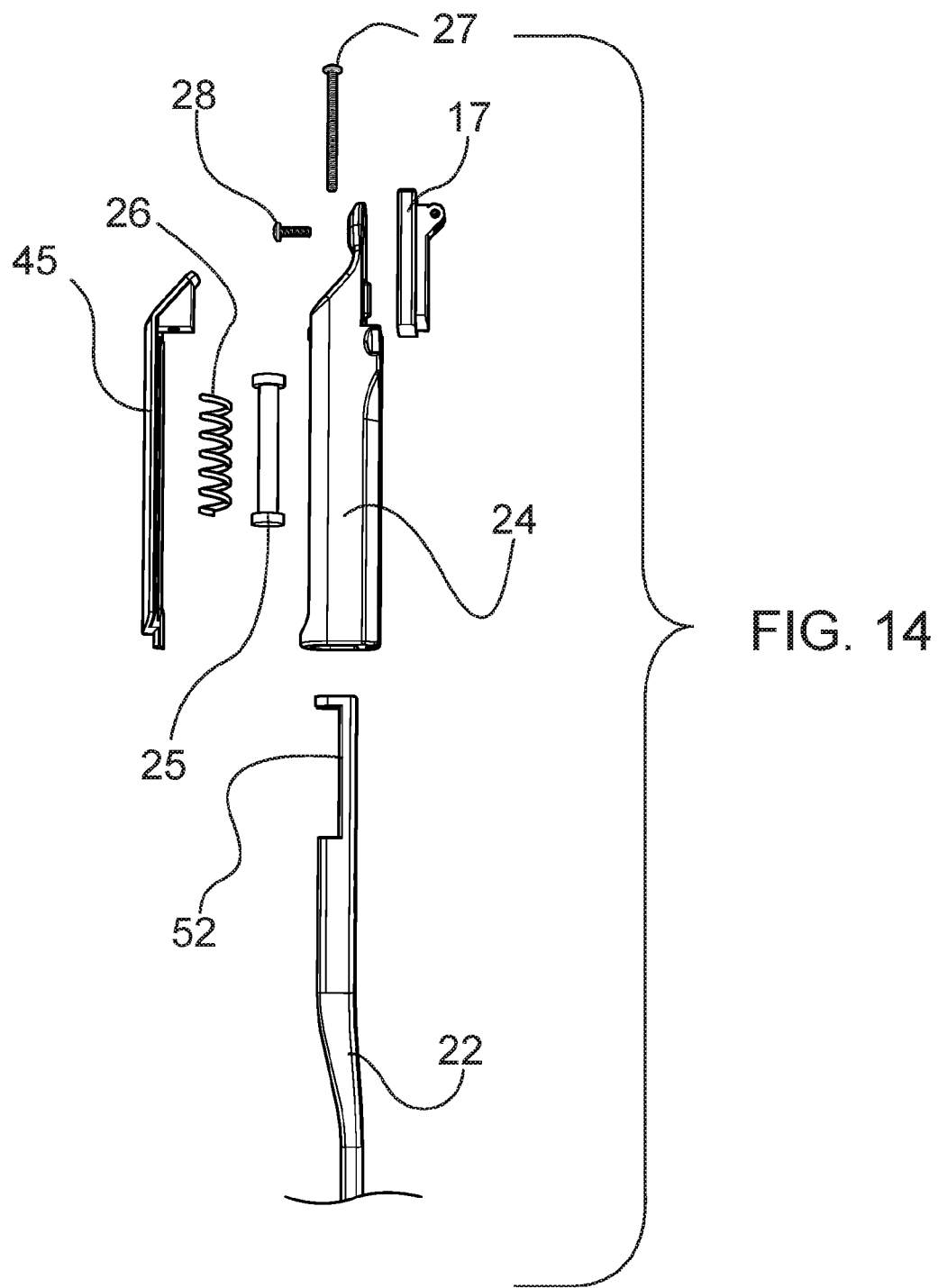
Figure 28:
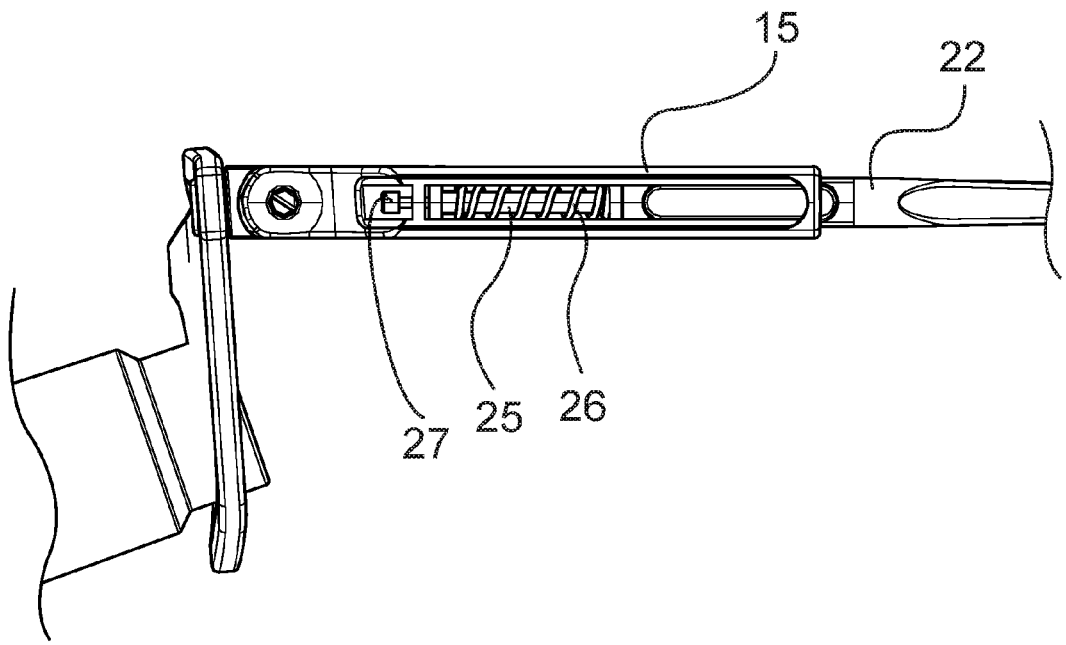
FIGS. 28-29 provide an exemplary embodiment of a tension adjuster as shown on a second bow.
Figure 29:
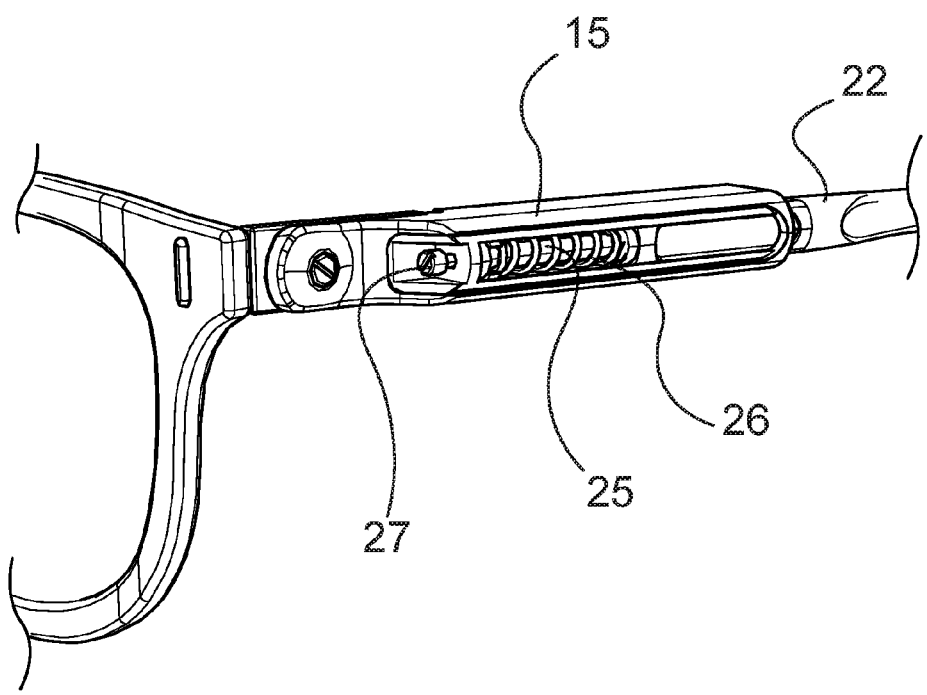
Figure 30:
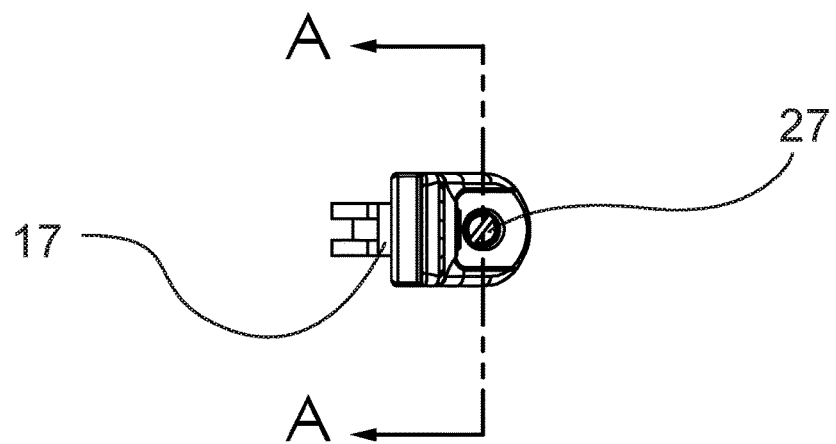
Figure 31:
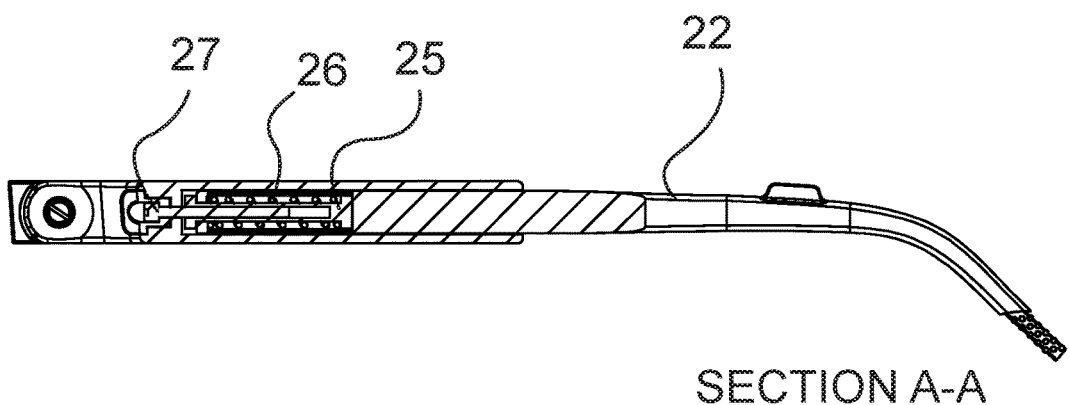
FIG. 31 provides a cross-sectional view of a tension adjuster along A-A of FIG. 30.
Figure 32:
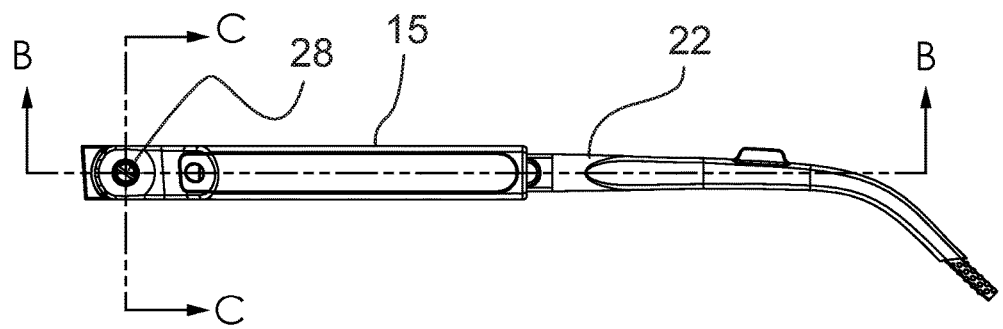

Some embodiments of a slip-resistant eyewear system 10 may comprise a tension adjuster 15 coupled to at least one of a first 18 and a second bow 19 of the eyewear frame 32 as shown in FIG. 9 which depicts an example of a tension adjuster 15 coupled to a first hinge 16 and first bow 18 of the eyewear frame 32. Turning now to FIGS. 12-14 which provide an exploded view of an example of a tension adjuster 15, the tension adjuster 15 may comprise a housing 24 within which a first end of the second bow 22 at least partially passes. The first end of the second bow 22 may comprise a recess 52 configured to seat an internally threaded barrel 25 and spring 26 therein. The internally threaded barrel 25 passes at least partially through the spring 26 as shown in the assembled depiction of FIGS. 28-29. An adjustment screw 27 passes at least partially into the housing 24, the recessed portion 52 of the first end of the second bow 22, and the internally threaded barrel 25 within which the adjustment screw 27 threadably couples to the internally threaded barrel 25. The user may adjust how far into the internally threaded barrel 25 the adjustment screw 27 passes by turning the adjustment screw 27 in order to tighten or loosen the tension and corresponding fit of the slip-resistant eyewear system 10 when worn by a user as shown in the cross-sectional views of the tension adjuster 15 in FIGS. 30-32. The internally threaded barrel 25, spring 26, and recessed portion 52 of the first end of the second bow 22 may be protected by a cover 45, through which the adjustment screw 27 may also pass. In some embodiments, the cover 45 may be substantially transparent to allow the user to see how far the adjustment screw 27 has been tightened or the cover 45 may comprise one or more measurement gradations to aid the user in consistently adjusting both tension adjusters 15 when each bow 18, 19 comprises a tension adjuster 15.

In some applications, such as for example, when the eyewear system comprises loupes 48, the user may desire to adjust the angle of the eyewear frame 32 relative to the bows 18, 19 and/or tension adjuster(s) 15 so as to change the angle at which the loupes 48 or other magnifying lenses are viewed through without forcing the user to change position or hold the user's head at an uncomfortable angle to properly utilize the loupes 48. This may be accomplished through the use of an angular adjustment screw 28 which passes through an end of the tension adjuster housing 24 proximal to the hinge 16, 17 of the eyewear frame. As shown in FIGS.

Figure 33:
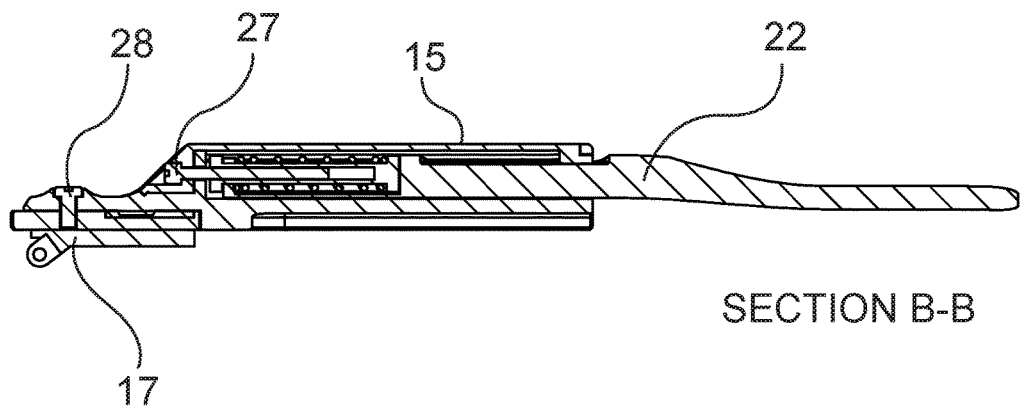
FIGS. 33 and 34 provide cross-sectional views of a tension adjustor along B-B and C-C of FIG. 32, respectively.
Figure 34:
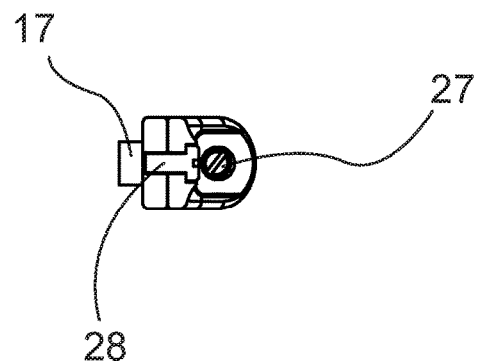

12-14, the housing 24 may comprise a recessed portion that allows the hinge 17 to be seated therein to minimize how far the tension adjuster 15 protrudes outward from the user's head. FIG. 38 provides an example in which the hinge 17 is parallel to the tension adjuster 15 and first end of the second bow 22. In FIG. 39, however, the angular adjustment screw 28 has been tightened to hold the hinge 17 at an angle relative to the tension adjuster 15 and the first end of the second bow 22 such that the eyewear frame 32 has been tilted to allow the user to look through the loupes 48 when the loupes 48 are substantially parallel to the ground rather than angled toward the ground as in FIG. 38. FIGS. 33-34 depict cross-sectional views illustrating the positioning of the angular adjustment screw 28 when it is tightened so as to threadably couple with the hinge 17.

Figure 4:
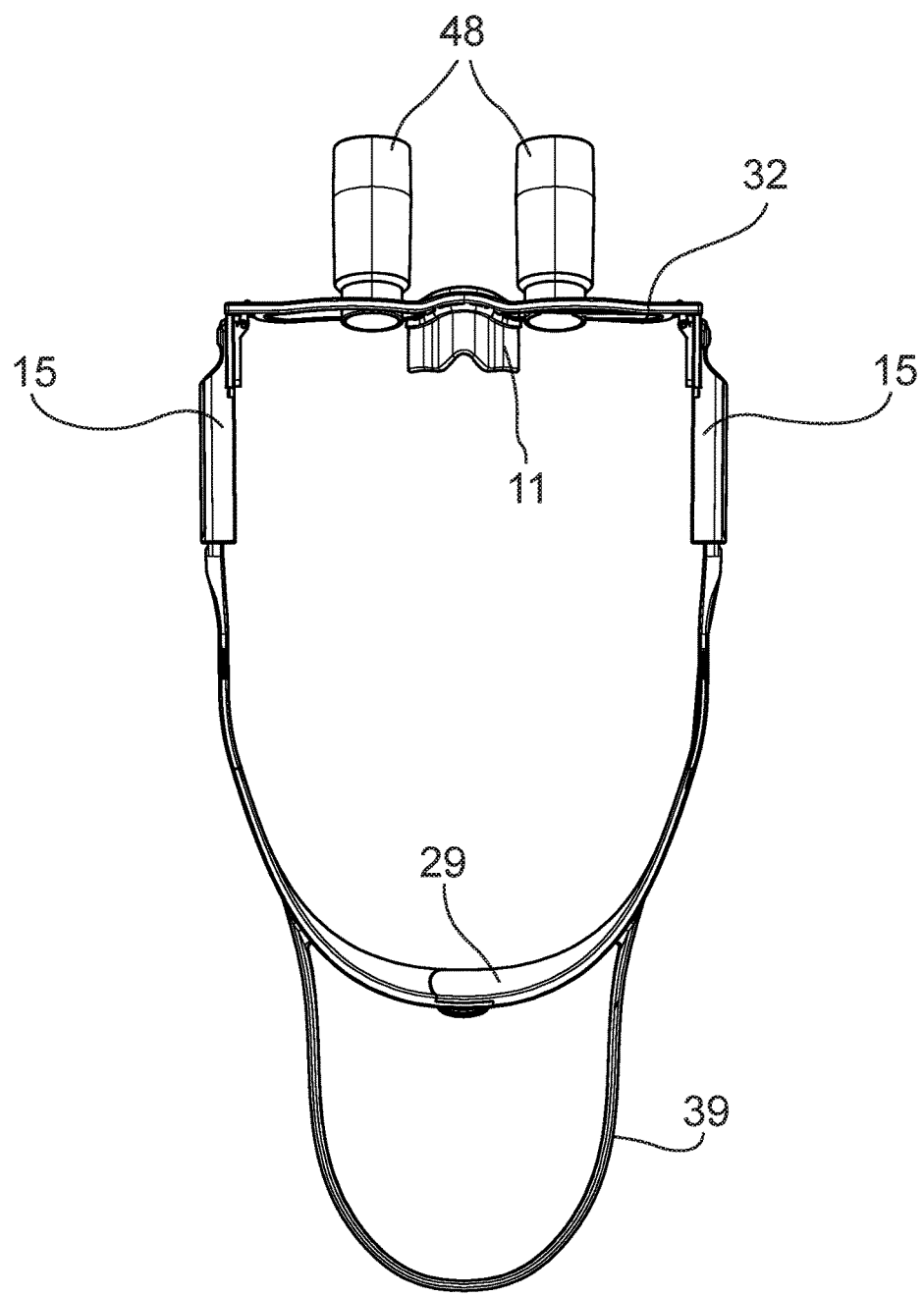
FIG. 4 is a top view of a slip-resistant eyewear system in accordance with the exemplary embodiment of FIGS. 1-3.
Figure 5:
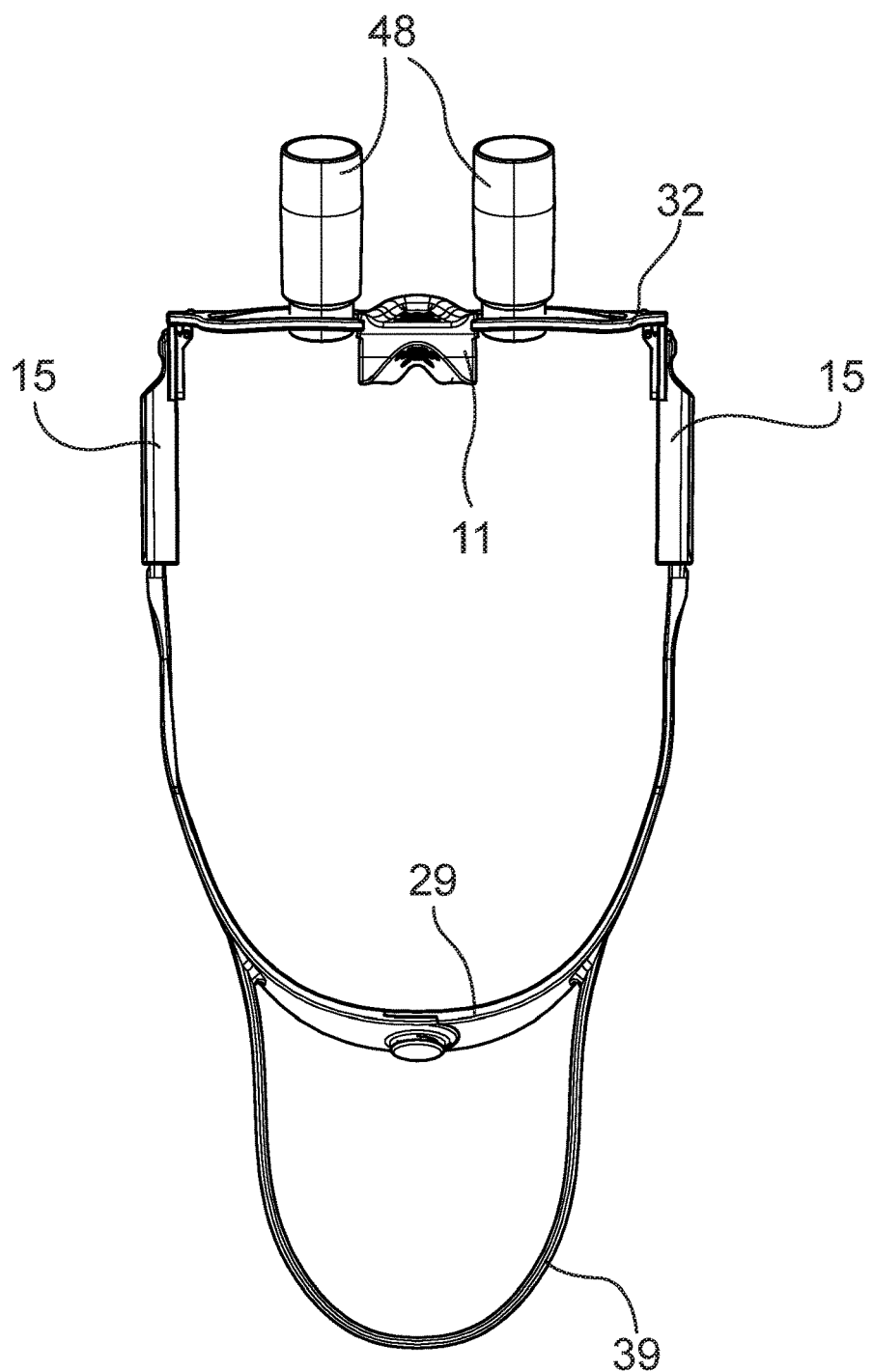
FIG. 5 is a bottom view of a slip-resistant eyewear system in accordance with the exemplary embodiment of FIGS. 1-4.
Figure 6:
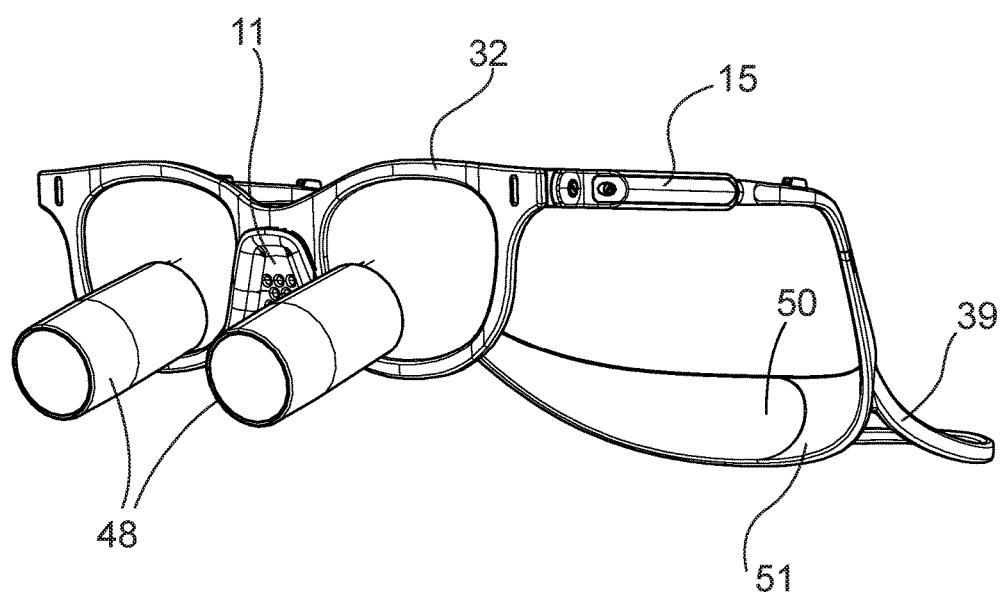
FIGS. 6-7 provide perspective views of exemplary embodiments of a slip-resistant eyewear system.
Figure 7:
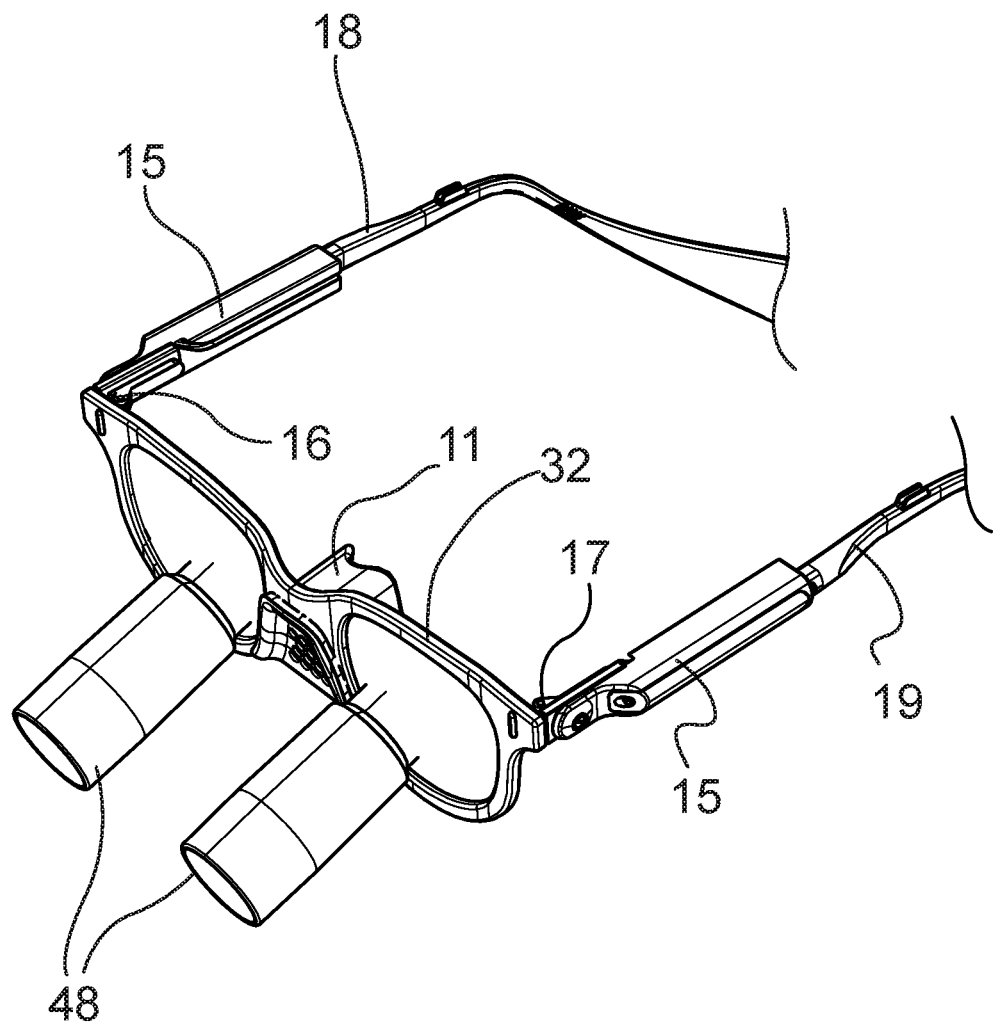
Figure 35:
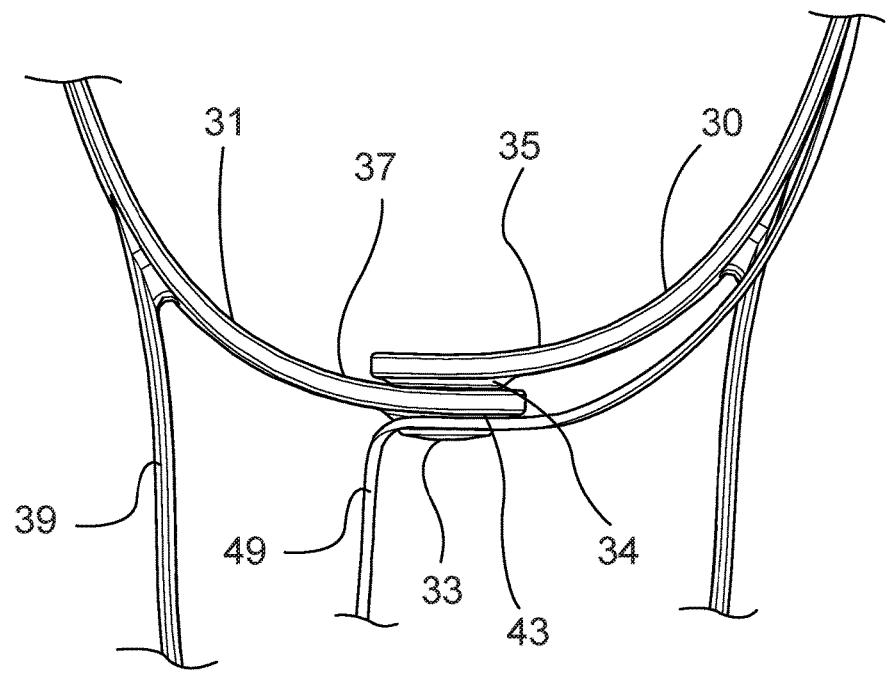
FIGS. 35-36 depict embodiments of a fasteners of an eyewear retainer of a slip-resistant eyewear system.
Figure 36:
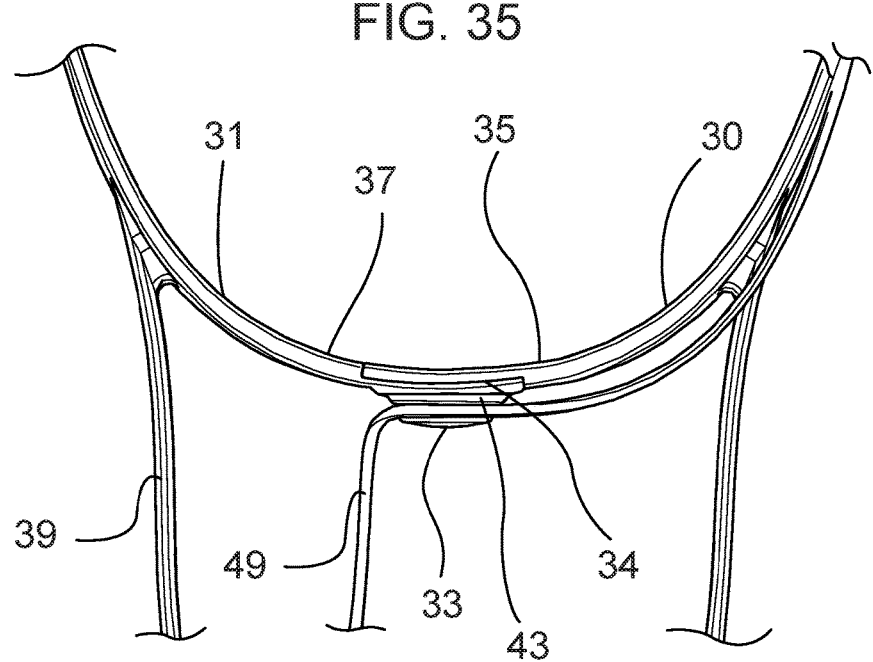

As shown in FIGS. 4-5, some embodiments of a slip-resistant eyewear system 10 may comprise an eyewear retainer 29 to securely fasten the slip-resistant eyewear system 10 to a user's head so as to prevent unintended movement or repositioning of the slip-resistant eyewear system 10 when in use. The eyewear retainer 29 may comprise first and second bow extension elements 30, 31 extending from a second end of the first and second bows 22, 23, respectively. While the first and second bow extension elements 30, 31 may be integral to the bows 18, 19 themselves, in some embodiments, the second end of the first and second bows 22, 23 are coupled to the second end of the first and second bow extension elements 36, 38, respectively. In order to allow a user to easily put on and remove the slip-resistant eyewear system 10, the eyewear retainer 29 may comprise first and a second fastening elements 50, 51 proximal to a first end of the first and second bow extension elements 35, 37. While this disclosure contemplates that any appropriate fastening mechanism may be used, such as for example, a magnetic or hook and loop closure, in some embodiments, as shown in FIG. 35, the first bow extension element 30 comprises a protrusion 33 proximal to the first end of the first bow extension element 35 that is received by an opening 34 in the second bow extension element 31 that is proximal to the first end of the second bow extension element 37 when the first ends of the bow extension elements 35, 37 are overlapped to secure the slip-resistant eyewear system 10 when in use. To enhance user comfort when the first and second bow extension elements 31, 31 are engaged with one another, the second bow extension element 31 may comprise a recess so that the first bow extension element remains substantially flush with the remaining portion of the first end of the second bow extension element 37 as shown in FIG. 36 rather than overlapping as in FIG. 35. This creates a smooth rather than uneven contact surface with the back of a user's head.

While any acceptable method of coupling the bow extension elements 30, 31 to the bows 18, 19 may be utilized, FIGS. 24-27 depict an exemplary manner of coupling the first and second bow extension elements 30, 31 to the second ends of the first and second bows 21, 23 which may be used on at least one each of the bows 18, 19 and bow extension elements 30, 31. As shown, the second end of the first bow 21 may comprise a plurality of raised protrusions 46 which mate with a plurality of corresponding openings 47 on the second end of the first bow extension element 36 to secure the first bow extension element 30 to the first bow 18.

Figure 10:
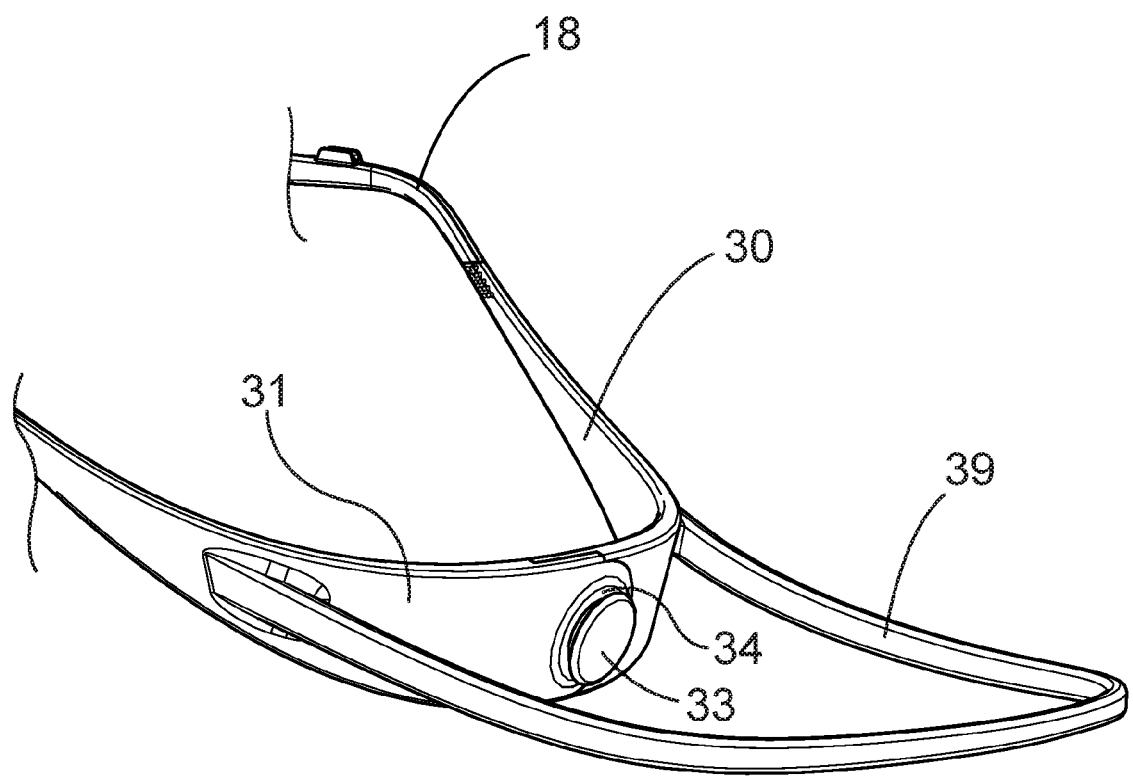
FIGS. 10-11 depict exemplary embodiments an eyewear retainer of a slip-resistant eyewear system.

Some embodiments of a slip-resistant eyewear system 10 may further comprise an eyewear retainer extension 39 that protrudes from the eyewear retainer 29 as shown in FIGS. 4-5 and 10. While the user could remove the slip-resistant eyewear system 10 by merely sliding the eyewear retainer 29 over the user's head, it may be preferable and more convenient for the user to avoid continually moving the system over the user's head. Thus, when the eyewear retainer 29 is fastened behind the head of a user, when the user desires to remove the slip-resistant eyewear system 10, the user unfastens the fastening elements 50, 51 of the eyewear retainer 29 and allows the slip-resistant eyewear system 10 to hang from the user's neck by the eyewear retainer extension 39 which supports the slip-resistant eyewear system 10 and allows the system to rest on the user's chest went not in use. This allows the slip-resistant eyewear system 10 to be easily reengaged by the user without the need to slide the system over the user's head.

Figure 8:
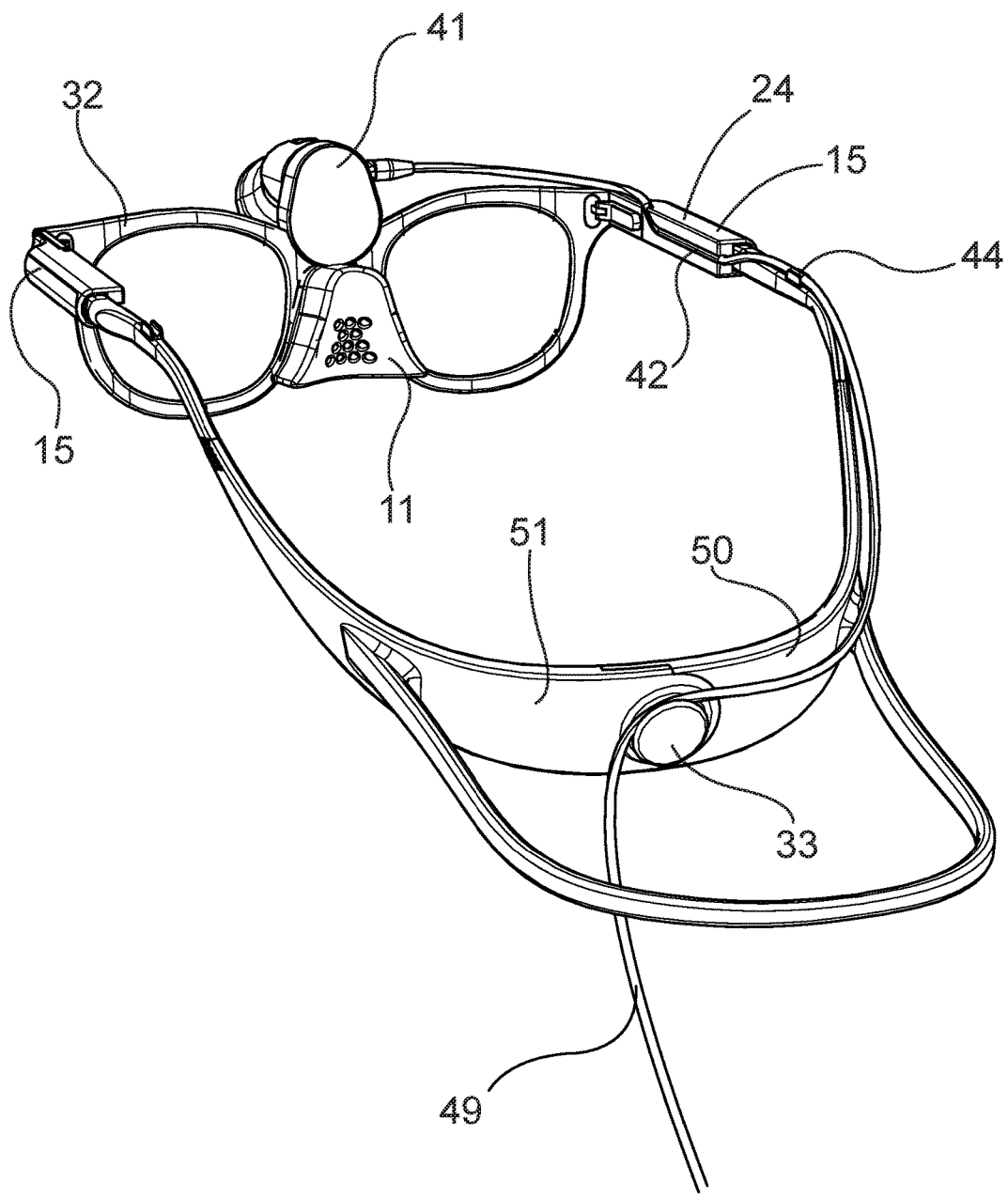
FIG. 8 depicts an exemplary embodiment of a slip-resistant eyewear system comprising a light mounted to at least a portion of an eyewear frame.
Figure 11:
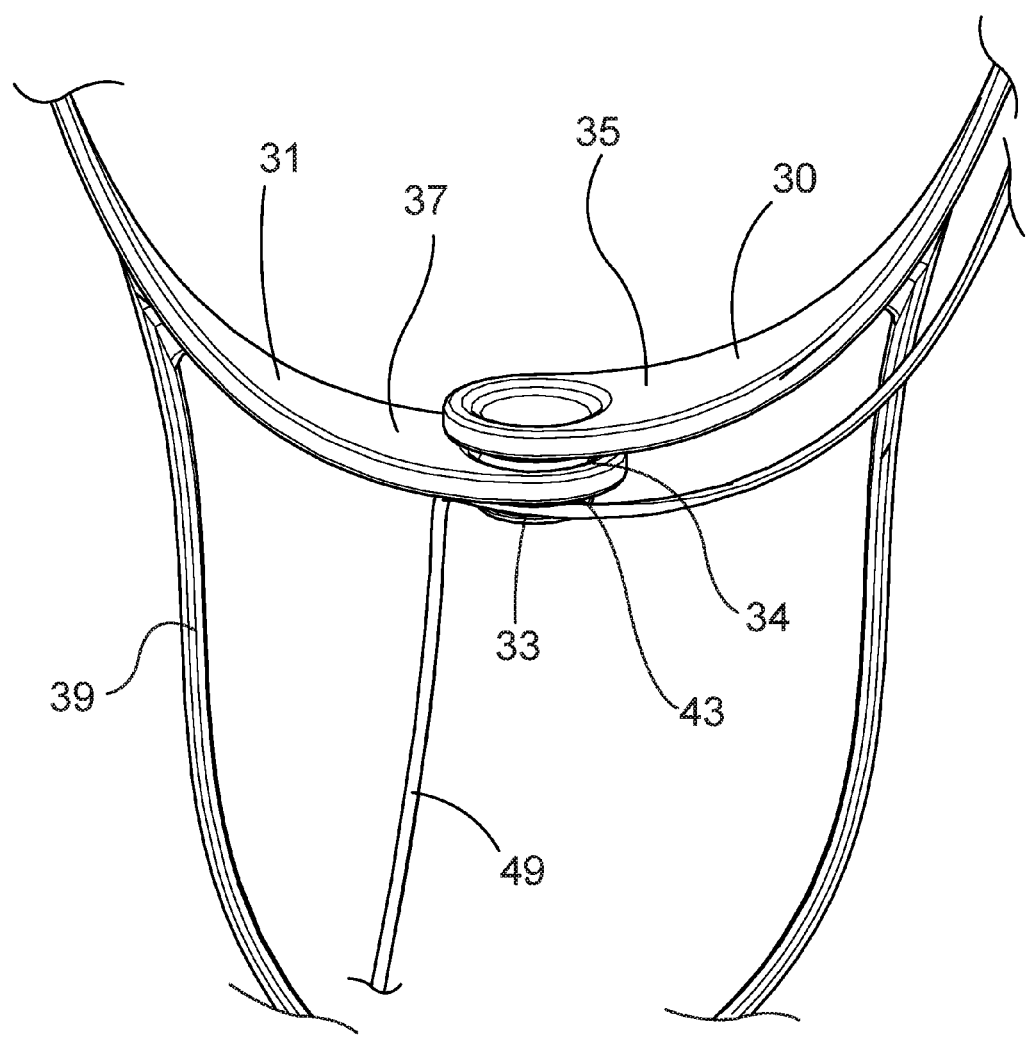

In some applications, the user may desire additional light to better illuminate the area that the user is viewing. Accordingly, some embodiments of a slip-resistant eyewear system 10 may comprise a light 41 or other source of illumination such as, for example, an LED bulb. FIG. 8 depicts such a light 41 coupled to the eyewear frame 32 proximal to the bridge 14 of the eyewear frame 32, but the illumination source may be located anywhere on the frame 32, such as for example, on one side of the frame or the other, that allows for appropriate illumination. A light bracket 53 (shown in FIG. 37) may be used to couple the light 41 to the eyewear frame 32 to allow for adjustment of the angle at which the light 41 is positioned relative to loupes 48 or to the work area to which the user's view is directed. If the light 41 requires a power source located remotely from the light 41, the power cord 49 of the light may be kept out of the user's way by running the power cord 49 through a channel 42 on either side of the housing 24 of one of the tension adjusters 15 as shown in FIG. 8. A clip 44 or other fastener may be located on the corresponding bow 18, 19 to further secure the power cord 49 and the eyewear retainer 29 may further comprise an eyewear retainer channel 43 in which the power cord 49 may be seated to allow the power cord 49 to run behind the back of the user. FIGS. 11 and 35-36 depict the eyewear retainer channel 43 being formed by the fastening elements 50, 51 of the eyewear retainer 29, but any other suitable location is also contemplated by this disclosure.

Figure 40:
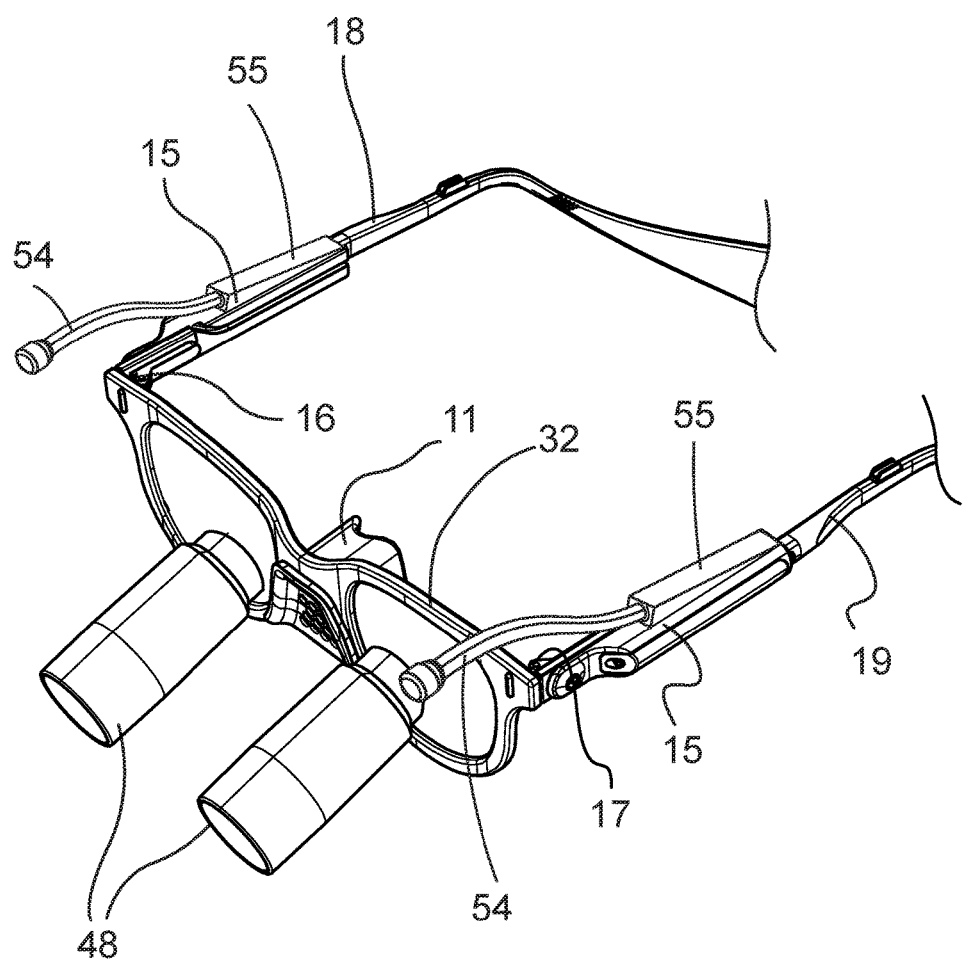
FIG. 40 depicts an exemplary embodiment of a slip-resistant eyewear system comprising a flexible-neck lighting system.
Figure 44:
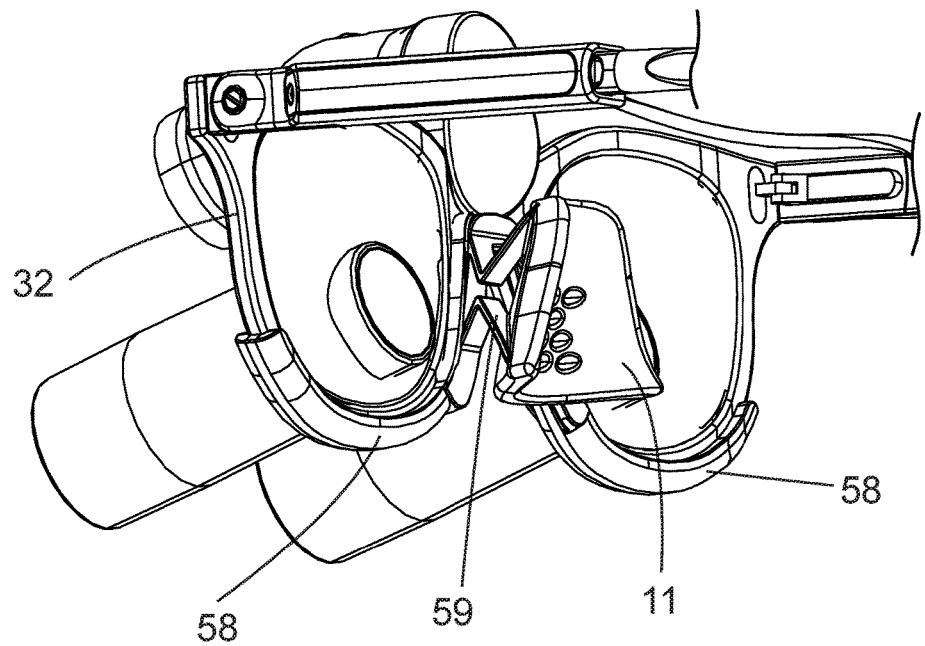
FIG. 44 provides an example of a slip-resistant eyewear system comprising a detachable nosepiece.

It may be desirable for the user to have the ability to adjust the angle or direction of one or more lights 41 on the slip-resistant eyewear system 10. Therefore, in some embodiments, as shown in FIG. 40, the slip-resistant eyewear system may further comprise a flexible-neck lighting system comprising one or more flexible-neck lights 54 to allow for adjustment. The one or more flexible-neck lights 54 may be located anywhere on the slip-resistant eyewear system 10, but in some embodiments as shown in FIG. 40, it may be preferable to locate a flexible-neck light 54 along the upper portion of the bow 18, 19 or tension adjustor 15. If the flexible-neck light 54 comprises a power cord 49, the power cord 49 may pass through a channel in the tension adjustor housing 24 or eyewear retainer 29 as discussed in association with other embodiments above. For lights 54 with a very low power requirement such as for example, light emitting diodes (LEDs), it may be preferable to use a battery as a power source which may be housed in flexible-neck light base 55 which may be located on the housing 24 of the tension adjustor 15, the bow 18, 19, the eyewear retainer 29, or any other suitable location on the slip-resistant eyewear system 10.

In some embodiments such as that which is depicted in FIG. 41, the slip-resistant eyewear system 10 may comprise a detachable eyewear retainer 29 so that the system may be used without the eyewear retainer 29 and eyewear retainer extension 39 or these elements may be used with an alternative slip-resistant eyewear system 10 if repair of the loupes 48 is necessary and the user has auxilliary loupes 48 that can be used while the primary item(s) are sent out for repair. While any suitable method for attaching the eyewear retainer 29 to the bows 18, 19 may be used, in some embodiments, the second end of each bow 21, 23 and the second ends of the first and second bow extension elements 36, 38 may comprise an opening 56 configured to pass an eyewear retainer attachment screw 57 therethrough to secure the eyewear retainer 29 to the bows 18, 19.

Figure 45:
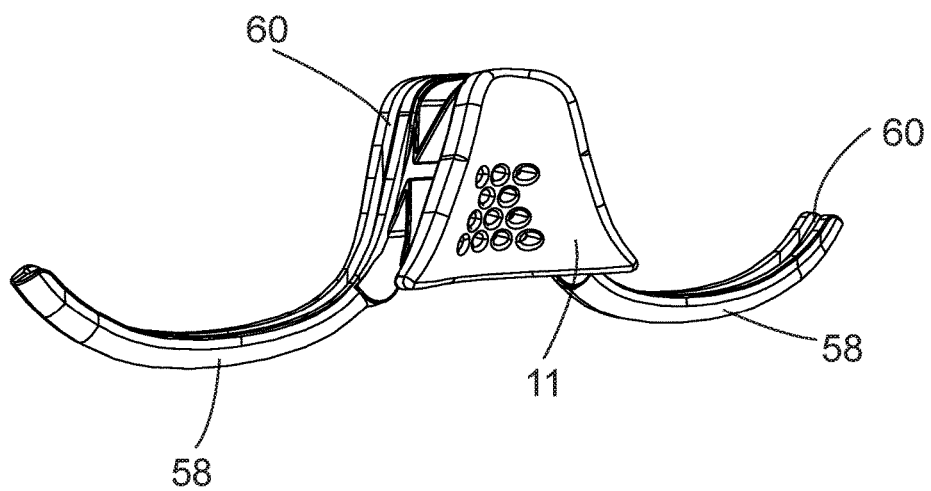
FIG. 45 depicts an exemplary embodiment of a detachable nosepiece comprising lower frame overlays.
Figure 46:
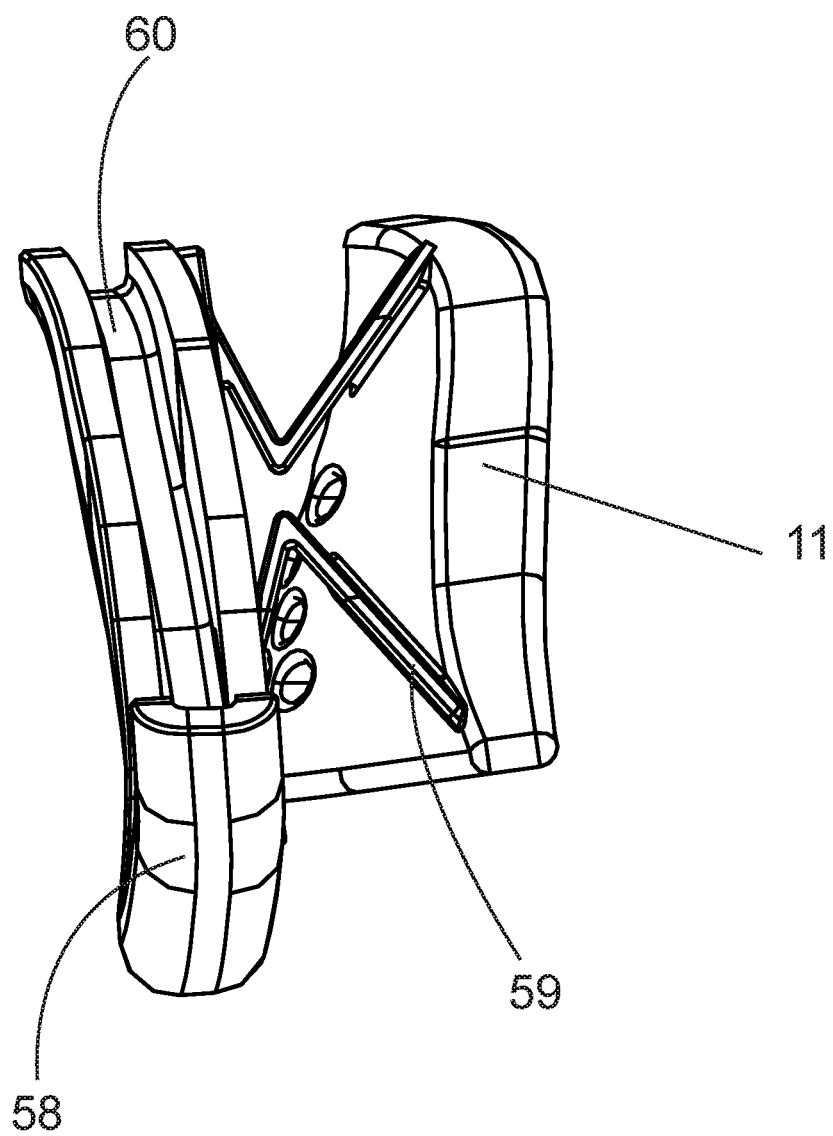
FIG. 46 provides a side view of an exemplary embodiment of a detachable nosepiece.

Referring now to FIGS. 44-47, some embodiments of a slip-resistant eyewear system 10 may comprise a detachable nosepiece 11 which, in some embodiments, may further comprise a lower frame overlay 58 to secure the detachable nosepiece 11 to the eyewear frame 32. Some such implementations may comprise an expander 59 that is used to reduce the thickness of the nosepiece 11. The expander 59 may be made of any suitable material, but is preferably comprised of a metal, alloy, or other lightweight material of appropriate strength to support the eyewear system on the user's face when in use. In some embodiments, it may be preferable to encapsulate the expander 59 in a rubber or other flexible material to enhance user comfort. Use of the expander 59 may allow for the nosepiece to be purchased in predetermined sizes, clipped to the expander 59, and the angle of the nosepiece 11 relative to the user's face can then be adjusted using the expander 59. While the expander 59 may clip directly to the eyewear frame 32, in some embodiments, the expander 59 may be coupled to a lower frame overlay 58 which may further comprise a groove 60 in its upper surface that is configured to mate with the lower portion of the eyewear frame 32 to secure the detachable nosepiece 11 to the frame 32 when in use as shown in FIGS. 45-46. The lower frame overlay 58 may enhance user comfort to prevent a rigid eyewear frame 32 from protruding into the face of the user and may also enhance the safety of the user by serving as a splashguard to prevent biohazardous materials from contacting the eyes of the user.

Figure 47:
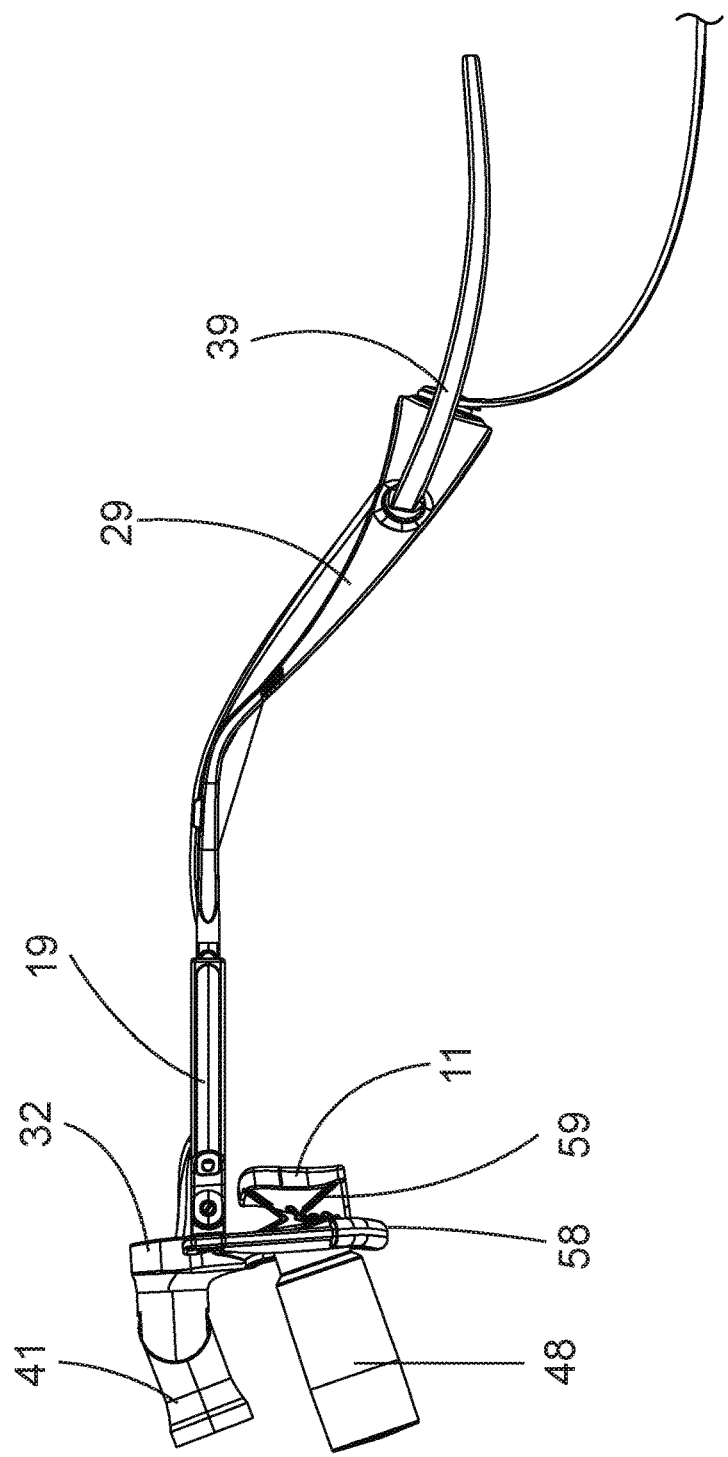
FIG. 47 provides a side view of an exemplary embodiment of a slip-resistant eyewear system comprising a detachable nosepiece with a lower frame overlay.
Figure 48:
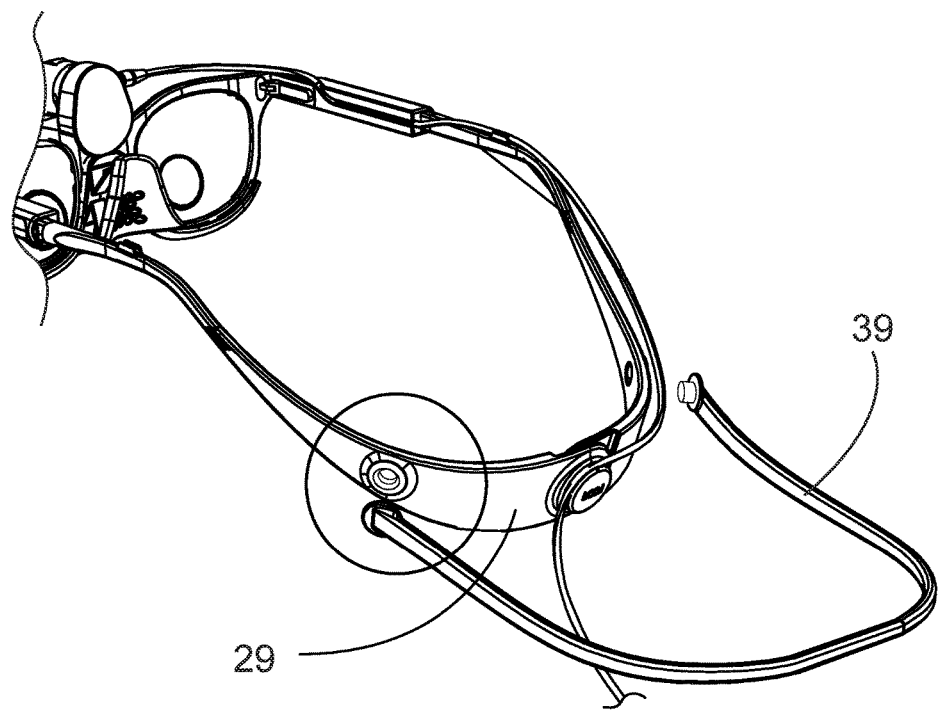
FIG. 48 depicts an exemplary embodiment of a slip-resistant eyewear system comprising a detachable eyewear retainer extension.
Figure 49:
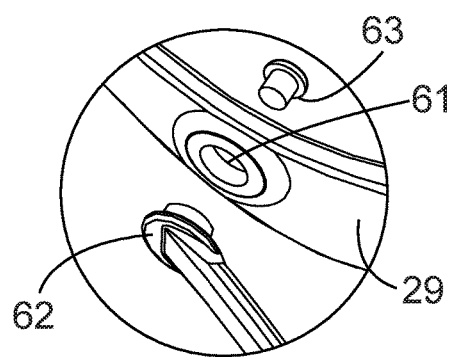
FIG. 49 depicts an exemplary embodiment of an attachment point of the detachable eyewear retainer extension of FIG. 48.
Figure 50:
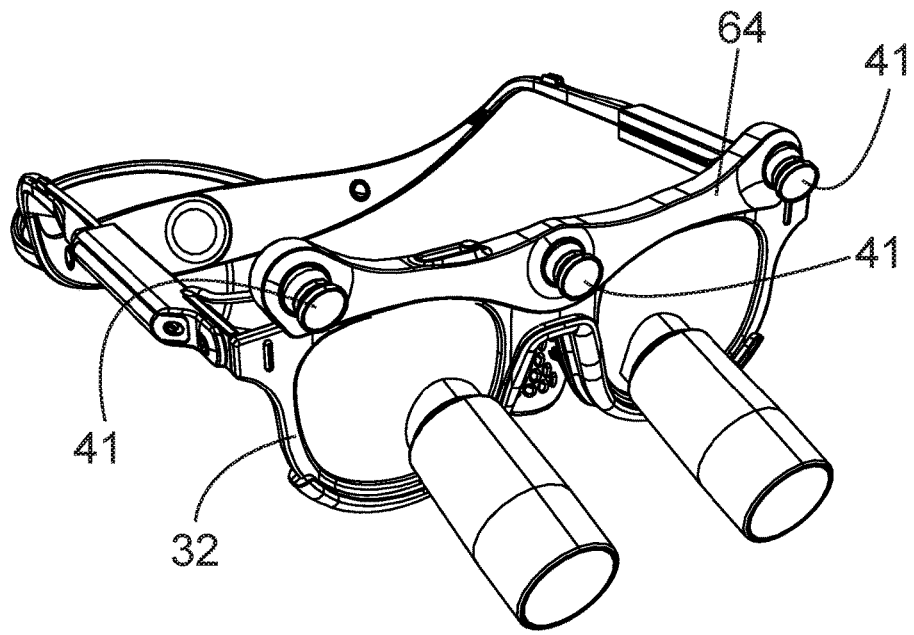
FIGS. 50-51 depict an exemplary embodiment of a slip-resistant eyewear system comprising a light bar.
Figure 51:
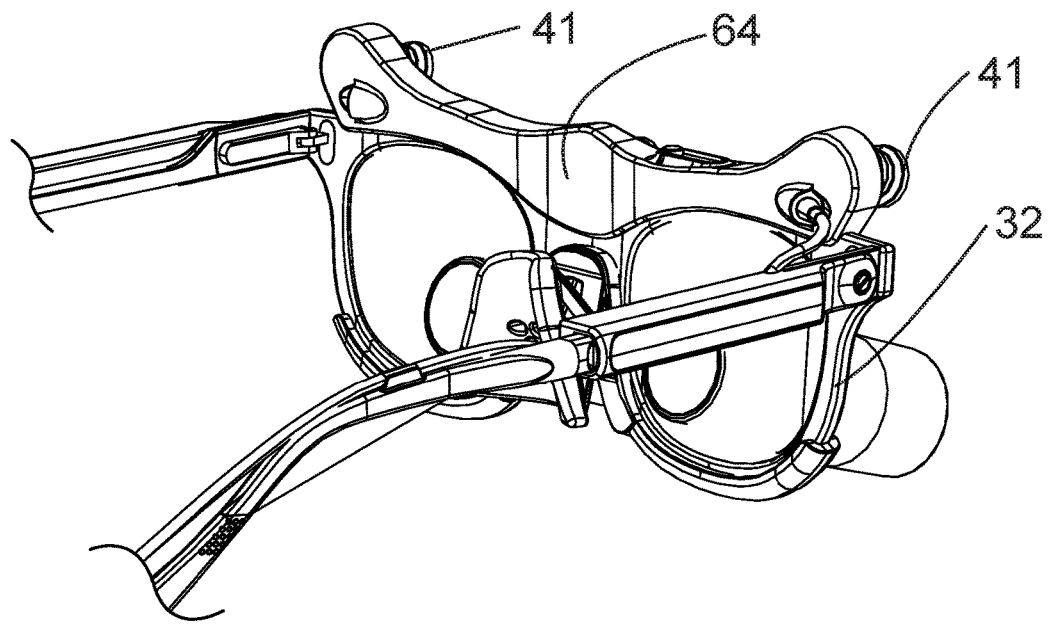
Figure 52:
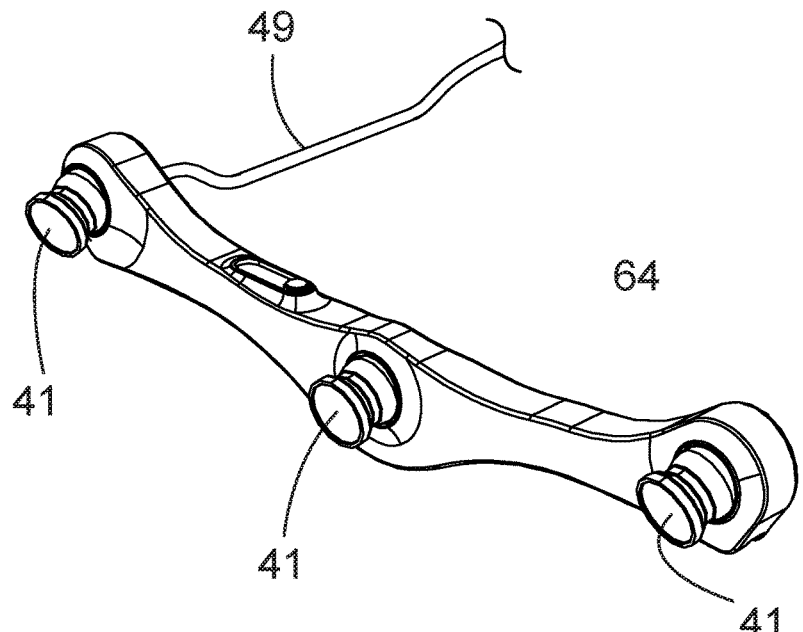
FIGS. 52-53 depict an exemplary embodiment of a light bar.
Figure 53:
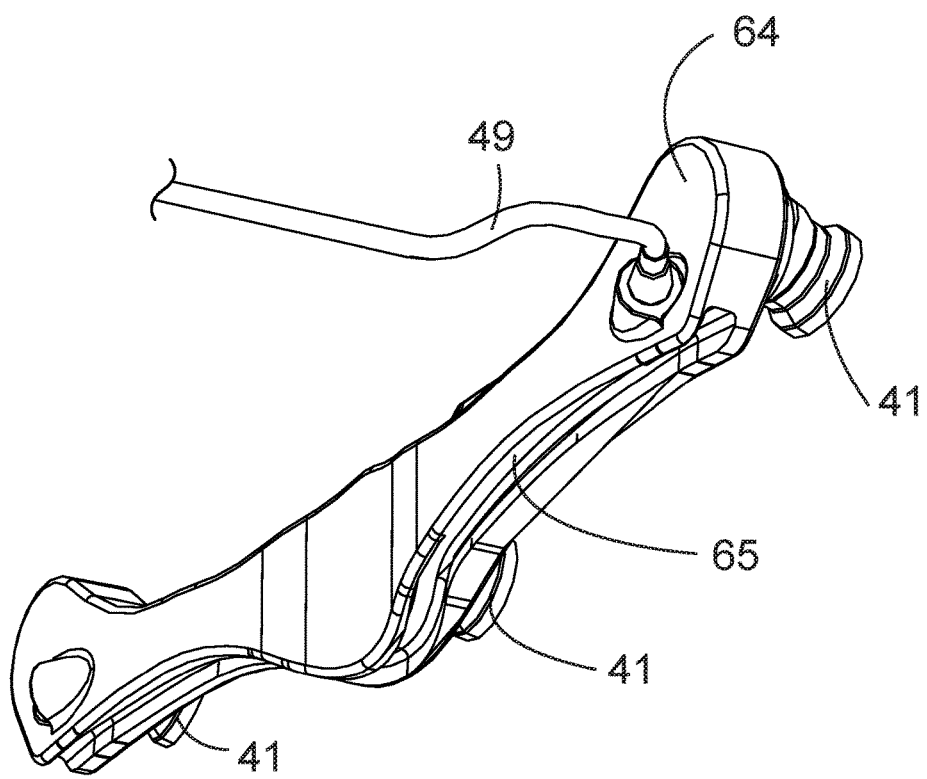

Some embodiments of a slip-resistant eyewear system 10 may comprise a detachable eyewear retainer extension 39 as shown in FIGS. 47-48. As depicted in FIG. 49, the eyewear retainer 29 may comprise an opening 61 configured to mate with an eyewear retainer extension end 62 such that an attachment screw 63 may be used to secure the detachable eyewear retainer extension 39 to the eyewear retainer 29.

As shown in FIGS. 50-53, some embodiments of a slip-resistant eyewear system 10 may comprise a light bar 64 for use when lighting is desired across a broader visual range than that which may be provided by a single point source of light. The light bar 64 may comprise any number of lights 41 which may be adjustable as to their angles and in some embodiments, one or more lights 41 may comprise a flexible neck to allow for a maximum range of adjustment by the user. The light bar may be couped to the top of the eyewear frame 32 and may be detachable. In instances in which the light bar 64 is not battery operated, the a power cord 49 may run through a channel on the housing of the tension adjustor 42 and/or a channel on the eyewear retainer 43. The light bar may further comprise a groove 65 configured to mate with the top of the eyewear frame 32 to secure the light bar when use is desired.

Figure 54:
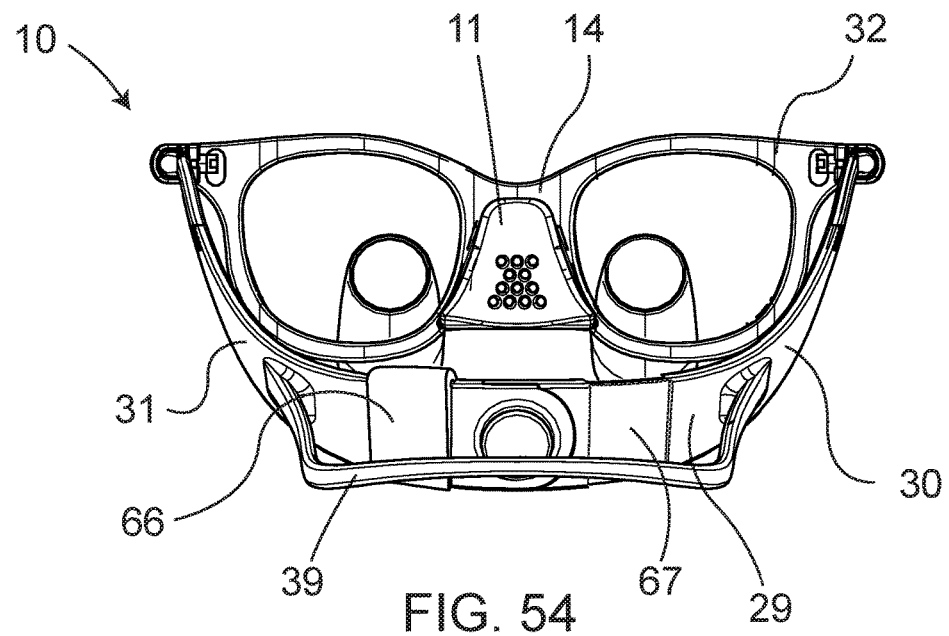
FIGS. 54-55 depict an exemplary embodiment of a slip-resistant eyewear system comprising a counterweight.
Figure 55:
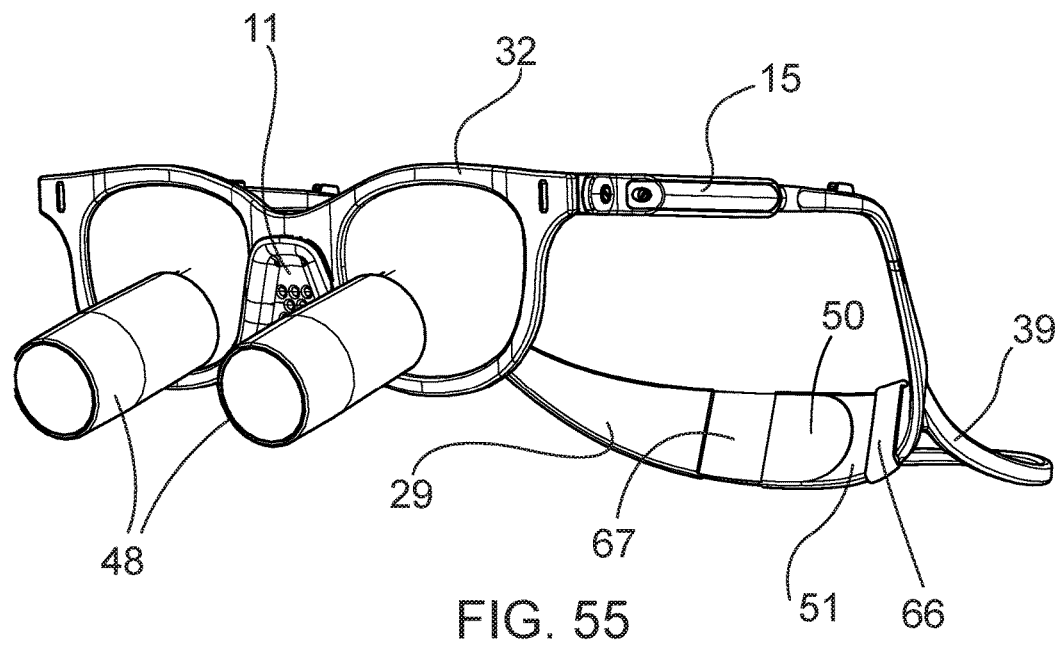
Figures 56, 57:
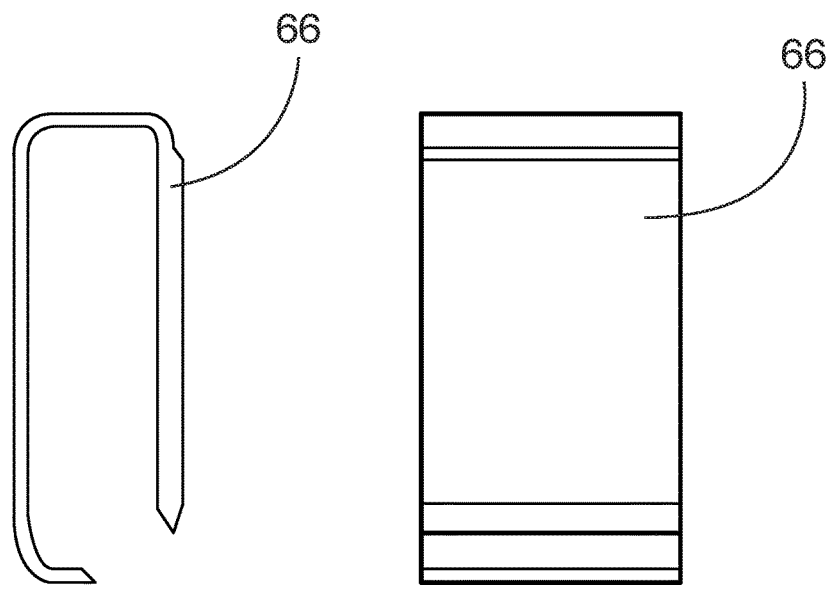
FIGS. 56-58 depict an exemplary embodiment of a counterweight.
Figure 58:
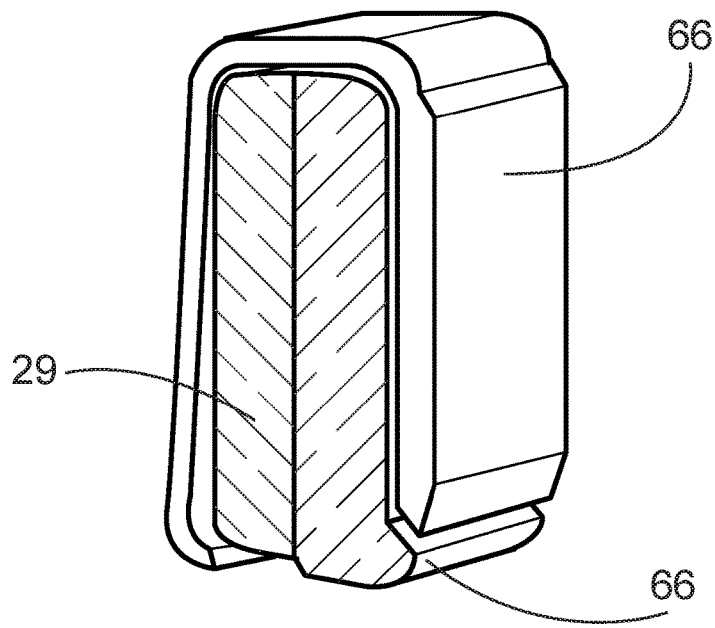

FIGS. 54-55 provide an example of the use of a counterweight 66 on the eyewear retainer 29 to reduce the pressure on the face of a user that results from a relatively heavy weight of the loupes 48. By using one or more counterweights 66 on the eyewear retainer 29, the weight of the loupes 48 can be more properly balanced across the slip-resistant eyewear system 10. In some embodiments, one or more counterweights 66 may be clipped or otherwise coupled to the eyewear retainer 29 as shown in FIGS. 54-55. One or more slots 67 may be located in the eyewear retainer 29 to aid in placement of the counterweights 66 and to prevent movement or a shift in positioning when a counterweight 66 is in use. The counterweights 66 may be of different weights and may be interchangeable to accommodate the user's need to provide counterbalance for differently weighted loupes 48. FIGS. 56-58 provide an example of a counterweight 66 and how it may be clipped or otherwise secured to the eyewear retainer 29. While any appropriate material may be used, in some implementations, it may be preferable to use a material such as by non-limiting example, tungsten, stainless steel, or any other metal or alloy which may be coated with rubber or a similar material to enhance user comfort.

In places where the description above refers to particular implementations a slip-resistant eyewear system, it should be readily apparent that a number of modifications may be made without departing from the spirit thereof and that these implementations may be applied to other to systems and techniques for slip-resistant eyewear systems.

What is claimed is:

1. A slip-resistant eyewear system comprising:
    a nosepiece comprising a nosepiece material configured to couple to a bridge of an eyewear frame;
    a tension adjuster configured to couple to a first hinge of the eyewear frame and a first bow, the tension adjuster comprising:
        a housing configured to house an internally threaded barrel that passes at least partially through a spring, the internally threaded barrel and the spring configured to seat at least partially within a first end of a first bow that passes at least partially into the housing; and
        an adjustment screw configured to threadably couple to the internally threaded barrel to adjust a tension of the first bow; and
    an eyewear retainer comprising:
        a first bow extension element configured to extend from a second end of the first bow, the first bow extension element comprising a protrusion extending outwardly from a first end of the first bow extension element; and
        a second bow extension element configured to extend from a second end of a second bow, the second bow extension element comprising an opening at a first end of the second bow extension element configured to secure the first and second bow extension elements together by receiving the protrusion of the first bow extension element when the first end of the second bow extension element overlaps the first end of the first bow extension element.

2. The slip-resistant eyewear system of claim 1, further comprising an eyewear retainer extension coupled to and extending from the eyewear retainer, the eyewear retainer extension configured to retain the eyewear around a neck of a user when the eyewear retainer is disengaged.

3. The slip-resistant eyewear system of claim 1, wherein the nosepiece further comprises at least one ventilation opening passing through the nosepiece material.

4. The slip-resistant eyewear system of claim 1, further comprising a light configured to couple to the eyewear frame.

5. The slip-resistant eyewear system of claim 4, wherein at least one of the housing of the tension adjuster and the eyewear retainer comprises a channel configured to pass a power cord of the light therethrough.

6. The slip-resistant eyewear system of claim 1, wherein the tension adjuster further comprises an angular adjustment screw configured to couple to the first hinge of the eyewear such that an angle of the eyewear frame is adjustable relative to the tension adjuster housing.

7. The slip-resistant eyewear system of claim 1, further comprising a plurality of raised protrusions on the second ends of the first and second bows configured to mate with a plurality of openings in the first and second bow extension elements, respectively.

8. A slip-resistant eyewear system comprising:
an eyewear frame comprising:
a nosepiece comprising a nosepiece material configured to couple to a bridge of the eyewear frame;
an expander configured to couple to the nosepiece;
a lower frame overlay configured to mate with a lower portion of the eyewear frame and couple to the expander;
a first hinge and a second hinge coupled to the eyewear frame, the first and second hinges coupled to first and second spring-loaded tension adjusters, respectively;
a first bow and a second bow coupled to the first and second tension adjusters, respectively;
a first bow extension element coupled to the first bow and comprising a first fastening element at a first end of the first bow extension element; and
a second bow extension element coupled to the second bow and comprising a second fastening element at a first end of the second bow extension element that is configured to mate with the first fastening element to secure the first and second bow extension elements together.

9. The slip-resistant eyewear system of claim 8, further comprising an eyewear retainer extension coupled to and extending from the eyewear retainer, the eyewear retainer configured to retain the eyewear around a neck of a user when the eyewear retainer is disengaged.

10. The slip-resistant eyewear system of claim 8, wherein at least one of the tension adjuster and the eyewear retainer comprises a channel configured to pass a power cord of the light therethrough.

11. The slip-resistant eyewear system of claim 8, wherein the tension adjuster further comprises an angular adjustment screw configured to couple to the first hinge of the eyewear such that an angle of the eyewear frame is adjustable relative to the spring-loaded tension adjuster.

12. The slip-resistant eyewear system of claim 8, further comprising a plurality of raised protrusions on an end of the first and second bows distal from the spring-loaded tension adjusters and configured to mate with a plurality of openings in the first and second bow extension elements, respectively.

13. A slip-resistant eyewear system comprising:
a nosepiece comprising a nosepiece material configured to couple to a bridge of an eyewear frame;
a tension adjuster configured to couple to a first hinge of the eyewear and a first bow, the tension adjuster comprising:
a housing configured to house an internally threaded barrel that passes at least partially through a spring, the internally threaded barrel and the spring configured to seat at least partially within a first end of a first bow passing at least partially into the housing; and
an adjustment screw configured to threadably couple to the internally threaded barrel to adjust a tension of the first bow; and
an eyewear retainer comprising first and second bow extension elements configured to extend from second ends of the first bow and a second bow, respectively and fasten behind a head of a user.

14. The slip-resistant eyewear system of claim 13, further comprising an eyewear retainer extension coupled to and extending from the eyewear retainer, the eyewear retainer extension configured to retain the eyewear around a neck of a user when the eyewear retainer is disengaged.

15. The slip-resistant eyewear system of claim 13, wherein the nosepiece further comprises at least one ventilation opening passing through the nosepiece material.

16. The slip-resistant eyewear system of claim 13, further comprising a light configured to couple to the eyewear frame.

17. The slip-resistant eyewear system of claim 13, wherein at least one of the housing of the tension adjuster and the eyewear retainer comprises a channel configured to pass a power cord of the light therethrough.

18. The slip-resistant eyewear system of claim 13, further comprising a plurality of raised protrusions on an end of the first and second bows distal from the tension adjusters and configured to mate with a plurality of openings in the first and second bow extension elements, respectively.

19. The slip-resistant eyewear system of claim 13, wherein the tension adjuster further comprises an angular adjustment screw configured to couple to the first hinge of the eyewear such that an angle of the eyewear frame is adjustable relative to the tension adjuster housing.

* * * * *